US007099215B1

(12) United States Patent (10) Patent No.: US 7,099,215 B1
Rotenberg et al. (45) Date of Patent: Aug. 29, 2006

(54) SYSTEMS, METHODS AND DEVICES FOR PROVIDING VARIABLE-LATENCY WRITE OPERATIONS IN MEMORY DEVICES

(75) Inventors: Eric Rotenberg, Raleigh, NC (US); Ravi K. Venkatesan, Raleigh, NC (US); Ahmed S. Al-Zawawi, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 27 days.

(21) Appl. No.: 11/056,205

(22) Filed: Feb. 11, 2005

(51) Int. Cl.
*G11C 7/00* (2006.01)
*G11C 11/24* (2006.01)
(52) U.S. Cl. .................. 365/204; 365/185.24; 365/194
(58) Field of Classification Search ................ 365/204, 365/189.01, 185.24, 49, 194
See application file for complete search history.

(56) References Cited

U.S. PATENT DOCUMENTS

| 6,212,093 | B1 | 4/2001 | Lindsey |
| 6,272,038 | B1 | 8/2001 | Clausen et al. |
| 6,373,783 | B1 * | 4/2002 | Tomita ........................ 365/233 |
| 2004/0120180 | A1 | 6/2004 | Rotenberg et al. |

OTHER PUBLICATIONS

Burger et al. "evaluation Future Microprocessors: The Simple scalar Toolset" *Tech Rep CS-TR-96-1308* CS Dept, University of Wisconsin-Madison (Jul. 1996).
Chandrakasan et al. "Minimizing Power Consumption in Digital CMOS Circuits" *Proc IEEE* 83(4): 498-523 (Apr. 1995).
Delaluz et al. "Scheduler-based DRAM Energy Management" *Design Automation Conference* (Jun. 2002).
Fan et al. "Memory Controller Policies for DRAM Power Management" *International Symposium on Low Power Electronics and Design* (Aug. 2001).
Flautner et al. "Drowsy Caches: Simple Techniques for Dreducing Leakage Power" *International Symposium on Computer Architecture* (Jul. 2002).
Hinton et al. "The Microarchitecture of the Pentium 4 Processor" *Intel Technology Journal* (Q1 2001).
Itoh et al. "Trends in Low-Power RAM Circuit Technologies" *Proceedings of the IEEE* 83(4)524-543 (Apr. 1995).
Lee et al. "A Technique for Improving Bandwidth Utilization" $33^{rd}$ International Symposium on Microarchitecture pp. 11-21 (2000).
Micron SDRAM 8M×16×4 Part No. MT48LC32M16A2TG-75 (2003).
Roth et al. "Molecular Aproach Toward Information Storage Based on the Redox Properties of Porphyrins in Self-Assembled Monlayers Designed for Molecular Information Storage" *J pPhys Chem B* 8639-8648 (2002).

(Continued)

*Primary Examiner*—Son T. Dinh
(74) *Attorney, Agent, or Firm*—Myers Bigel Sibley & Sajovec, PA

(57) ABSTRACT

A memory system includes storage cells, a respective one of which is configured to store a fixed charge therein when a write voltage applied thereto is above a predetermined threshold voltage and to discharge the fixed charge therefrom when the write voltage applied thereto is below the threshold voltage. The storage cells may be charged and/or discharged at a latency that is a function of a voltage differential between the write voltage and the threshold voltage. A variable-latency write circuit for the storage cells is configured to dynamically vary the voltage differential between the write voltage and the threshold voltage to provide a variable-latency write operation that stores the fixed charge therein or discharges the fixed charge therefrom. Related methods are also discussed.

31 Claims, 15 Drawing Sheets

OTHER PUBLICATIONS

Roth et al. "Comparison of Electron-Transfer and Charge-Retention Characteristics of Porphyrin-Containing Self-Assembled Monolayers Designed for Molecular Information Storage" *J pPhys Chem B* 8639-8648 (2002).

Roth et al. "Characterization of Charge Storage in Redox-Active Self-Assembled Monolayers" *Langmuir* 18: 4030-4040 (2002).

Sherwood et al. "Automatically Characterizing Large Scale Program Behavior" *10th International Conference on Architectural Support for Programming Languages and Operating Systems* (Oct. 2002).

Zhang et al. "A Permutation-based Page Interleaving Scheme to Reduce Row-Buffer Conflicts and Exploit Data Locality" *33rd International Symposium on Microarchitecture* pp. 32-41 (Dec. 2002).

Bard et al. "Electrochemcial Methods: Fundamentals and Applications" John Wiley and Sons, pp. 92-96 (2001).

Itoh et al. "VLSI Memory chip Design" *Springer Series in Advanced Microelectronics* pp. 117-123, 403 (2001).

* cited by examiner

SYSTEMS, METHODS AND DEVICES FOR PROVIDING VARIABLE-LATENCY WRITE OPERATIONS IN MEMORY DEVICES

FIELD OF THE INVENTION

The present invention relates to memory devices, and more particularly, to power management in memory devices.

BACKGROUND OF THE INVENTION

Traditionally, semiconductor materials, such as silicon, have been used to implement memory circuits. Typically, the semiconductor materials are used in combination with dielectric and conductive materials to fashion transistors, capacitors, resistors, inductors and other basic circuit elements, which are arranged in various combinations to form memory cells and other components of memory devices.

Other types of materials are currently being investigated to replace semiconductor materials in memory devices and other electronics applications, due to the ongoing desire to produce electronic devices with greater information storage density, lower cost, higher speed, and/or other desirable characteristics. Such new materials may include organic molecular materials that can store information by taking on various oxidation states in response to applied signals. Such materials offer potentially higher component density, response speeds, and/or energy efficiency in memory applications.

A variety of approaches have been proposed for such molecular memory devices. For example, ZettaRAM™ is an emerging technology which may replace conventional dynamic random-access memory (DRAM) in computer and/or other memory systems. In ZettaRAM™, the conventional capacitor in a DRAM cell may be replaced with "charge-storage" molecules to form a molecular capacitor. The amount of charge stored in the molecular capacitor is independent of write voltage. In other words, there is a predetermined threshold voltage above which the device stores a fixed amount of charge, and below which the device discharges the fixed amount of charge. A logical "1" may be written by charging the molecules at a voltage above the threshold voltage, also called programming. A logical "0" may be written by discharging the molecules at a voltage below the threshold voltage, also called erasing. Further description of molecular memory devices can be found in U.S. Pat. No. 6,212,093 to Lindsey, U.S. Pat. No. 6,272,038 to Clausen et al., and U.S. Patent Application Publication No. 2004/0120180 to Rotenberg et al.

Recently, numerous studies have been performed on energy management in memory systems. Low-power memory systems may be desirable for a wide range of computers and other electronics, such as cell phones, personal digital assistants (PDAs), portable consumer electronics, laptops, and/or other battery-constrained electronic devices. For example, energy management schemes have been proposed based on switching between different device operating modes, such as active, standby, nap, and power-down. Additional description of such energy management schemes can be found in "Scheduler-based DRAM Energy Management" by V. Delaluz, A. Sivasubramaniam, M. Kandemir, N. Vijaykrishnan, and M. J. Irwin, Design Automation Conference, June 2002, and in "Memory Controller Policies for DRAM Power Management" by X. Fan, C. S. Ellis, and A. R. Lebeck, Int'l Symposium on Low Power Electronics and Design, August 2001.

Also, techniques have been proposed to reduce row-buffer conflicts and increase row buffer hit rates, such as those described in "A Permutation-based Page Interleaving Scheme to Reduce Row-buffer Conflicts and Exploit Data Locality" by Z. Zhang, Z. Zhu, and X. Zhang, $33^{rd}$ Int'l Symposium on Microarchitecture, December 2000, pp. 32–41. This in turn may result in fewer bitline state transitions, because data may remain in the row buffer for a longer period of time. As recognized in "Trends in Low-Power RAM Circuit Technologies" by K. Itoh, K. Sasaki, and Y. Nakagome, Proc. of the IEEE, 83(4), April 1995, pp. 524–543, bitline energy consumption may be a major component of total memory system energy consumption, thereby leading to reduced energy consumption in main memory. Further details regarding bitline energy consumption can be found in "VLSI Memory Chip Design" by K. Itoh, Springer Series in Advanced Microelectronics, 2001, pp. 117–123.

SUMMARY OF THE INVENTION

Some embodiments of the present invention provide a memory system including a plurality of storage cells. A respective one of the storage cells is configured to store a fixed charge therein when a write voltage applied thereto is above a predetermined threshold voltage, and discharge the fixed charge therefrom when the write voltage applied thereto is below the threshold voltage. The storage cell is charged and/or discharged at a latency that is a function of a voltage differential between the write voltage and the threshold voltage. The memory system further includes a variable-latency write circuit for the plurality of storage cells. The variable-latency write circuit may be configured to dynamically vary the voltage differential between the write voltage and the threshold voltage to provide a variable-latency write operation that stores the fixed charge therein or discharges the fixed charge therefrom.

In some embodiments, the variable-latency write circuit may be configured to dynamically vary the write voltage applied to the storage cell responsive to a control signal from a processing device. More particularly, the variable-latency write circuit may be configured to provide the write voltage at a first voltage differential from the threshold voltage responsive to a first control signal from the processing device, and provide the write voltage at a second voltage differential from the threshold voltage that is greater than the first voltage differential responsive to a second control signal from the processing device. The first control signal may indicate that the write operation does not delay operations of the processing device. The second control signal may indicate that the write operation delays operations of the processing device. The variable-latency write circuit may be configured to provide the write voltage at the first voltage differential to increase latency of the write operation and reduce power consumption of the storage cell and/or the memory system relative to that at the second voltage differential. Further, the variable-latency write circuit may be configured to provide the write voltage at the second voltage differential to reduce latency of the write operation relative to that at the first voltage differential.

Other embodiments of the invention combine the memory system with the processing device. The processing device may include a central processing unit and a cache memory device. The first control signal may be a writeback request, and the second control signal may be a fetch request. The writeback request may be received at the variable-latency write circuit when a corresponding block of the cache memory device has been modified and is evicted from the cache memory device. The block of the cache memory device may be evicted when it is a least-recently-used (LRU) block. The processing unit may further include a memory controller having a memory request queue therein. The variable-latency write circuit may be configured to provide the write voltage at the second voltage differential when the memory request queue includes a fetch request and/or more than one writeback request. The plurality of storage cells may define a DRAM device, and the write voltage may be an applied bitline voltage. The DRAM device may include a row buffer therein, and the variable-latency write circuit may be further configured to provide the write voltage at the first voltage differential and/or at the second voltage differential responsive to a row buffer miss.

In some embodiments of the present invention, the storage cells may include a charge storage molecule. For example, the charge storage molecule may be a porphyrin molecule and/or a ferrocene molecule. The charge storage molecule may be configured to store a fixed charge therein when the write voltage is above the threshold voltage, and discharge the fixed charge therefrom when the write voltage is below the threshold voltage. The threshold voltage may be defined by an oxidation potential for the charge storage molecule.

Some embodiments of the present invention provide a device for writing to a plurality of storage cells. The storage cells are configured to store a fixed charge therein when a write voltage applied thereto is above a threshold voltage, and discharge the fixed charge therefrom when the write voltage applied thereto is below the threshold voltage. The device includes a variable-latency write circuit for the plurality of storage cells that is configured to dynamically vary a voltage differential between the write voltage and the threshold voltage to provide a variable-latency write operation that stores the fixed charge in the storage cells or discharges the fixed charge therefrom.

Some embodiments of the present invention provide methods of performing write operations in a memory device. The memory device may include a plurality of storage cells, a respective one of which is configured to store a fixed charge therein when a write voltage applied thereto is above a threshold voltage, and discharge the fixed charge therefrom when the write voltage applied thereto is below the threshold voltage. These methods include dynamically varying a voltage differential between the write voltage and the threshold voltage to perform a variable-latency write operation that stores the fixed charge in the respective one of the storage cells or discharges the fixed charge therefrom.

Further embodiments of the present invention provide for dynamically varying the voltage differential by dynamically varying the write voltage applied to the storage cell responsive to receiving a control signal. More specifically, dynamically varying the write voltage may include providing the write voltage at a first voltage differential from the threshold voltage responsive to a first control signal, and providing the write voltage at a second voltage differential from the threshold voltage that is greater than the first voltage differential responsive to a second control signal. The write voltage may be provided at the first voltage differential when the write operation does not delay operations of a processing device, to perform an increased-latency write operation and reduce power consumption of the storage cell relative to that at the second voltage differential. In contrast, the write voltage may be provided at the second voltage differential when the write operation delays operations of the processing device, to perform a reduced-latency write operation relative to that at the first voltage differential.

Other embodiments of the present invention provide that the first control signal may be a writeback request, and the second control signal may be a fetch request. The write voltage may be provided at the first voltage differential and/or at the second voltage differential responsive to a cache miss. The write voltage may also be provided at the first voltage differential and/or at the second voltage differential responsive to a row buffer miss in a row buffer of the memory device. The write voltage may be provided at the second voltage differential when a memory request queue in a memory controller includes a fetch request and/or more than one writeback request. The writeback request may be received when a corresponding block of cache memory has been modified and is evicted from the cache memory device. The block of the cache memory device may be evicted when it is a least-recently-used (LRU) block.

Still other embodiments of the present invention provide storage cells that may include a charge storage molecule having a predetermined oxidation potential. For example, the charge storage molecule may be a porphyrin molecule and/or a ferrocene molecule. The voltage differential may be dynamically varied by dynamically varying a voltage differential between the write voltage and an oxidation potential of the charge storage molecule to perform a variable-latency write operation that stores the fixed charge in the charge storage molecule or discharges the fixed charge therefrom.

DETAILED DESCRIPTION OF EMBODIMENTS OF THE INVENTION

Figure 1:
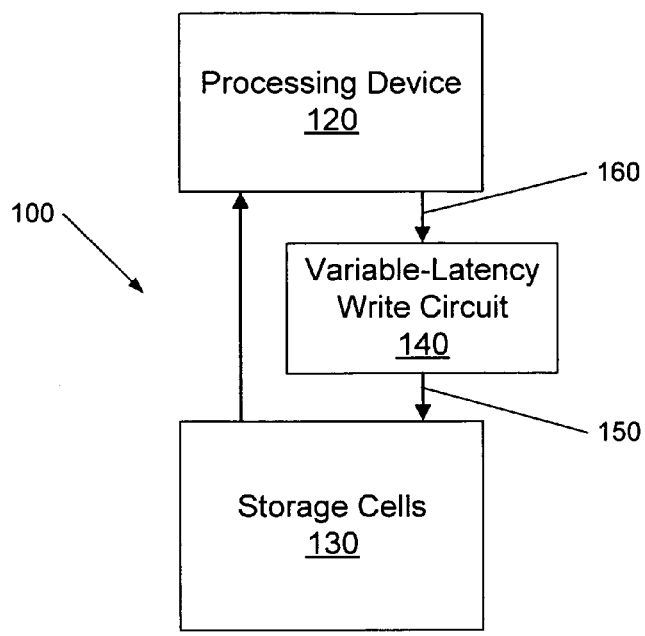
FIG. 1 is a block diagram illustrating memory systems and related devices and methods according to some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures. As used herein the term "and/or" includes any and all combinations of one or more of the associated listed items and may be abbreviated by "/". In addition, the singular forms "a", "an" and "the" are intended to include the plural forms as well, unless the context clearly indicates otherwise.

The present invention is described below with reference to block diagrams and/or flowchart illustrations of systems, devices, and/or methods according to embodiments of the invention. It should be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

It will also be understood that although the terms first, second, etc. are used herein to describe various elements, these elements should not be limited by these terms. These terms are only used to distinguish one element or embodiment from another element or embodiment. Thus, a first element or embodiment could be termed a second element or embodiment, and similarly, a second element or embodiment may be termed a first element or embodiment without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating memory systems, devices, and/or methods according to some embodiments of the present invention. As shown in FIG. 1, a memory system 100 may include a processing device 120, a plurality of storage cells 130, and a variable-latency write circuit 140. Each storage cell is configured to store a fixed charge when a write voltage that is above a predetermined threshold voltage is applied to the storage cell. Similarly, each storage cell is configured to discharge the fixed charge when the applied write voltage is below the threshold voltage. For example, in some embodiments, the storage cells 130 may be charge storage molecules, such as porphyrin molecules and/or ferrocene molecules, that are configured to store a fixed charge when the write voltage is above an oxidation potential for the molecules and discharge the fixed charge when the write voltage is below the oxidation potential. The storage cells 130 are charged and/or discharged at a latency that is a function of a voltage differential between the write voltage and the threshold voltage. More particularly, the storage cells 130 may be charged/discharged at a faster rate as the voltage differential between the write voltage and the threshold voltage is increased. Likewise, the storage cells 130 may be charged/discharged at a slower rate as the voltage differential between the write voltage and the threshold voltage is decreased. Although discussed herein with reference to particular write and threshold voltages, charge storage molecules in accordance with embodiments of the present invention may be engineered to be charged/discharged above/below various threshold voltages, depending on the desired characteristics for a particular application.

Still referring to FIG. 1, the variable-latency write circuit 140 for the plurality of storage cells is configured to dynamically vary the voltage differential between the write voltage and the threshold voltage to provide a variable-latency write operation that stores and/or discharges the fixed charge. More particularly, the variable-latency write circuit 140 is configured to provide a hybrid write policy by dynamically varying the write voltage 150 applied to the storage cells responsive to a control signal 160 from the processing device 120. For example, the variable-latency write circuit 140 may be configured to provide the write voltage 150 at a first voltage differential from the threshold voltage responsive to a first control signal from the processing device 120, and provide the write voltage 150 at a second voltage differential from the threshold voltage that is greater than the first voltage differential responsive to a second control signal from the processing device 120. The first control signal may indicate that the write operation does not delay operations of the processing device 120, while the second control signal may indicate that the write operation delays operations of the processing device 120. As such, the variable-latency write circuit 140 may provide the write voltage 150 at the first voltage differential to reduce power consumption of the storage cells and/or the memory system by increasing latency of the write operation. Alternatively, the variable-latency write circuit 140 may provide the write voltage 150 at the second voltage differential to reduce latency of the write operation and thereby minimize wait time for the processing device 120. Note that, although only write operations have been described herein thus far, a read operation may be analogous to writing a "0", i.e., by discharging the desired storage cell.

Figure 2:
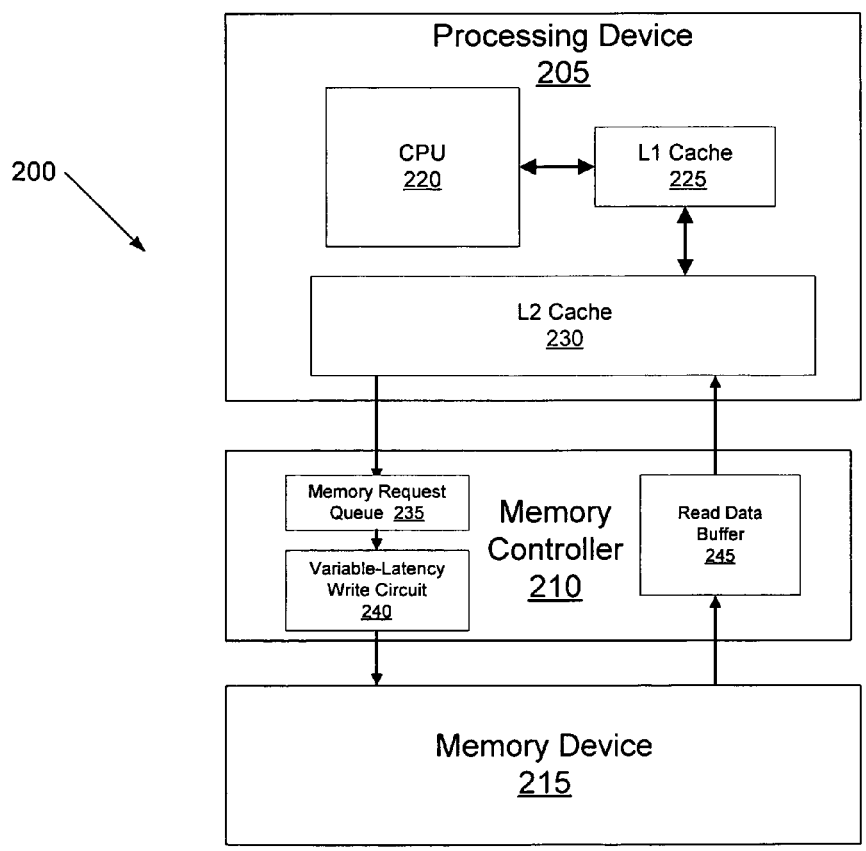
FIG. 2 is a block diagram further illustrating memory systems and related devices and methods according to some embodiments of the present invention.

FIG. 2 is a block diagram further illustrating memory systems according to some embodiments of the present invention. Referring to FIG. 2, a memory system 200 includes a processing device 205, a memory controller 210, and a memory device 215. The memory device 215 includes a plurality of storage cells configured to be charged or discharged when an applied write voltage is above or below a predetermined threshold voltage, as described above. In some embodiments, the memory device 215 may be a dynamic random access memory (DRAM) device, and the storage cells may be charge storage molecules that are used to replace the conventional capacitors in a DRAM device. As such, the memory device 215 may be considered a molecular memory device.

The processing device 205 includes a central processing unit (CPU) 220 and cache memory. In particular, the processing device 205 includes Level 1 (L1) cache 225 and Level 2 (L2) cache 230. As the CPU 220 typically operates much faster than the memory device 215, memory access time may be a bottleneck for overall performance. As a result, an application might spend a considerable amount of time waiting for data from the memory device 215. The cache memory 225 and 230 provides smaller, high-speed buffer memory between the CPU 220 and the memory device 215. Accordingly, data may be fetched from the cache 225 or 230 instead of from the memory device 215. Thanks to the shorter access time between the cache and the CPU 220, performance may be improved. The operation and benefits of cache memory are well known in the art and need not be discussed further herein.

The memory controller 210 provides an interface between the processing device 205 and the memory device 215. The memory controller includes a memory request queue 235, a variable-latency write circuit 240, and a read data buffer 245. The read data buffer 245 receives and stores data that is requested from the memory device 215, and provides the requested data to the processing device 205. The memory request queue 235 receives and stores memory requests from the L2 cache 230, such as fetch and/or writeback requests transmitted by the L2 cache 230, and provides the memory requests to the variable-latency write circuit 240.

The variable-latency write circuit 240 is configured to provide a hybrid write policy by dynamically varying the bitline voltage applied to the memory device 215 relative to the cell threshold voltage and responsive to the received request. For example, the variable-latency write circuit 240 may be configured to provide the bitline voltage at a first voltage differential from the threshold voltage responsive to a writeback request, and provide the bitline voltage at a second voltage differential from the threshold voltage that is greater than the first voltage differential responsive to a fetch request. Writeback requests from the L2 cache 230 may not directly stall the CPU 220. As such, the variable-latency write circuit 240 may provide the bitline voltage at the first voltage differential to reduce power consumption of the storage cell by increasing the latency of the write operation responsive to receiving the writeback request. In contrast, fetch requests from the L2 cache 230 may directly stall the CPU 220. Thus, the variable-latency write circuit 240 may provide the bitline voltage at the second voltage differential to minimize CPU 220 wait time by reducing the latency of the write operation responsive to receiving the fetch request. Accordingly, a variable-latency write circuit 240 according to embodiments of the present invention can provide a hybrid write policy that balances a trade-off between narrower bitline voltage differentials which increase energy efficiency and wider bitline voltage differentials which increase write speed. Thus, cell and/or memory system power consumption may be reduced while device performance may be maintained and/or increased.

In some embodiments, memory systems according to the present invention may be employed in conjunction with an eager writeback policy. As such, writeback requests from the L2 cache 230 may be received at the variable-latency write circuit 240 whenever a modified or "dirty" block of the cache memory is evicted from the L2 cache 230. For instance, a dirty block may be evicted from the L2 cache 230 when it is a least-recently-used (LRU) block. In other embodiments, the variable-latency write circuit 240 may be configured to provide the bitline voltage based on the number and/or type of requests in the memory request queue 235. For example, the variable-latency write circuit 240 may provide the bitline voltage at the second voltage differential when the memory request queue 235 includes a fetch request and/or when the memory request queue 235 includes more than one writeback request, to increase performance when needed.

Although FIGS. 1 and 2 illustrate exemplary memory systems, it will be understood that the present invention is not limited to such configurations, but is intended to encompass any configuration capable of carrying out the operations described herein. For example, although illustrated as a separate component in FIG. 2, the memory controller 210 may be included in the processing device 205 in some embodiments of the present invention. Also, although illustrated as part of the memory controller 210, the variable-latency write circuit 240 may be a separate component, or may be included in the processing device 205 and/or the memory device 215 in alternate embodiments of the present invention.

Figure 3A:
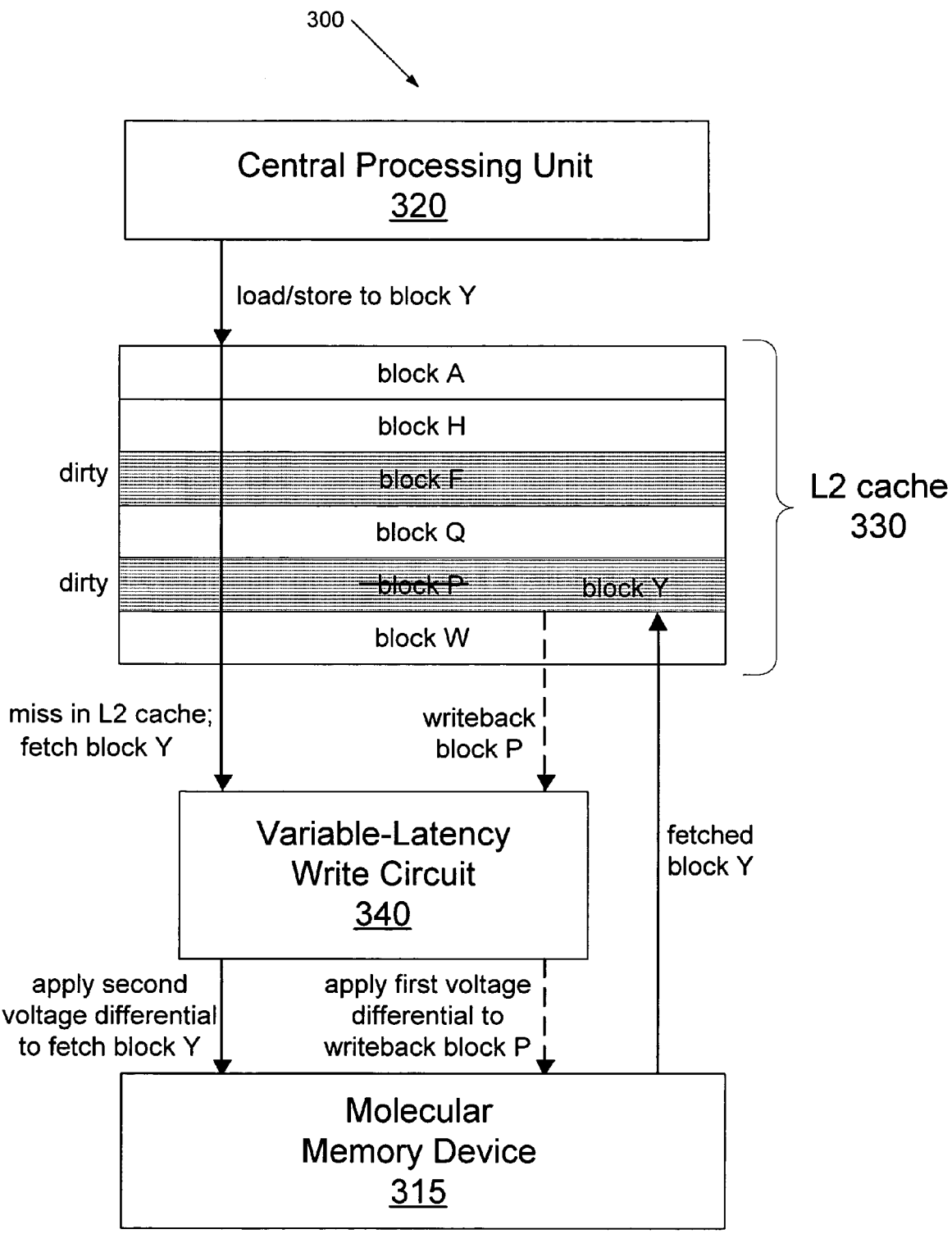
FIGS. 3A to 3C are detailed block diagrams further illustrating memory systems, devices, and methods according to some embodiments of the present invention.
Figure 3B:
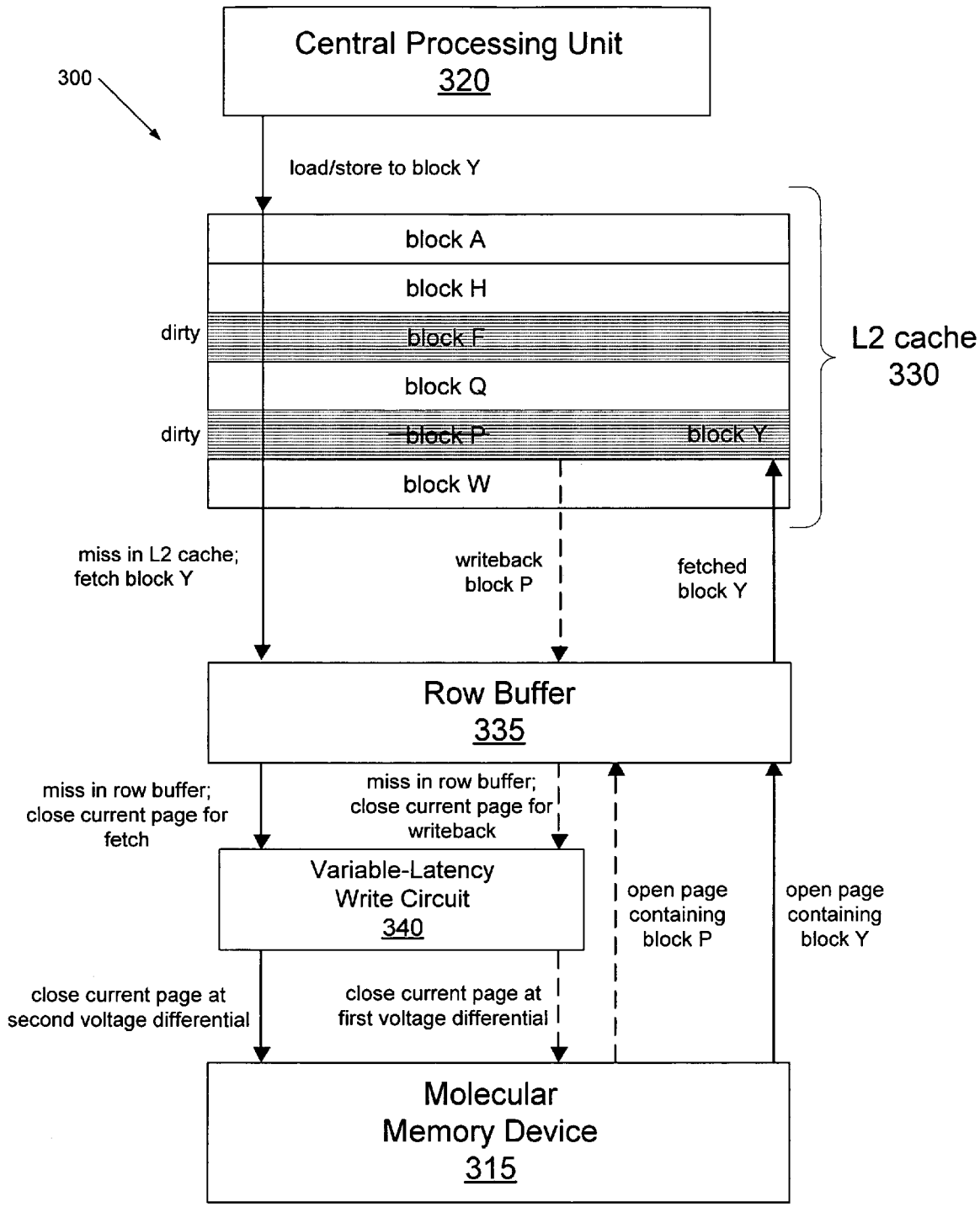
Figure 3C:
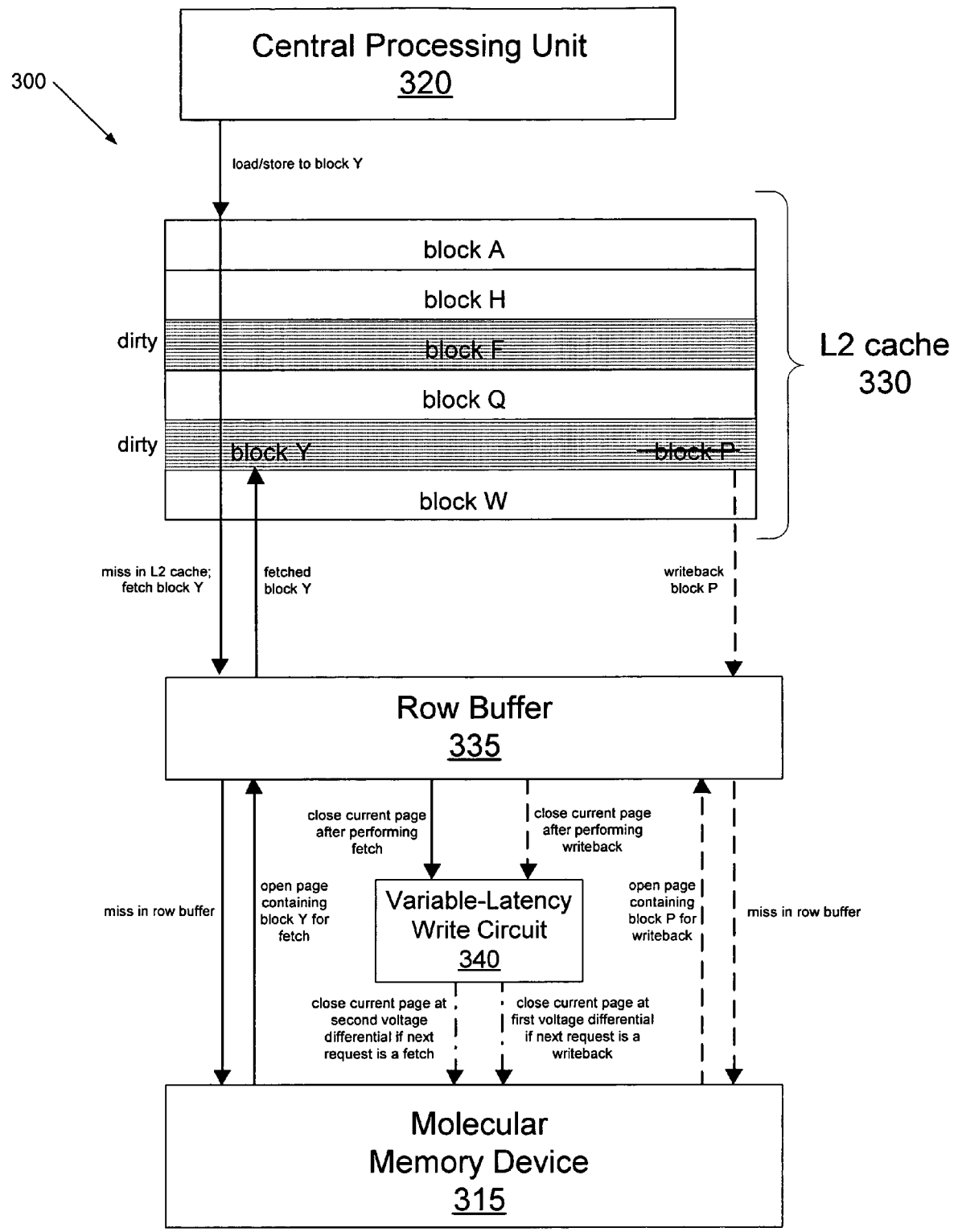

FIGS. 3A to 3C are detailed block diagrams further illustrating memory systems, devices, and methods according to some embodiments of the present invention. As shown in FIGS. 3A to 3C, exemplary memory systems and/or methods 300 include a molecular memory device 315, a central processing unit (CPU) 320, L2 cache 330, and a variable-latency write circuit 340.

Referring now to FIG. 3A, the CPU 320 sends a request for a particular memory block Y to the L2 cache 330. As block Y is not currently available in the L2 cache 330, a cache miss results. Responsive to the cache miss, the L2 cache 330 sends a fetch request for block Y to the variable-latency write circuit 340. Since the fetch request may delay operations at the CPU 320, the variable-latency write circuit 340 provides a bitline voltage at a second voltage differential that is greater than a first voltage differential to the corresponding bitline of the molecular memory device 315 to fetch block Y. As such, the fetch request is performed at a reduced latency, reducing and/or minimizing delay for the CPU 320, and block Y is transferred from the molecular memory device 315 to the L2 cache 330. In some embodiments, block Y may be transferred from the molecular memory device 315 to the L2 cache 330 via a read data buffer, such as the read data buffer 245 of FIG. 2.

However, as shown in FIG. 3A, the L2 cache 330 is full. Thus, a block of memory in the L2 cache 330 is written back to the molecular memory device 315 so that block Y can be transferred to the L2 cache 330. Block P in the L2 cache 330 is "dirty," i.e., has been modified, and therefore may be updated in the molecular memory device 315 to maintain consistency between the data in the L2 cache 330 and the corresponding data in the molecular memory device 315. Accordingly, a request to writeback block P is sent from the L2 cache 330 to the variable-latency write circuit 340. In some embodiments, block P may be transferred from the L2 cache 330 to a write data buffer to free space in the L2 cache 330 for block Y. Since the writeback request may not directly delay operations at the CPU 320, the variable-latency write circuit 340 provides a bitline voltage at the first voltage differential, which is smaller than the second voltage differential, to the corresponding bitline of the molecular memory device 315 to writeback block P. As such, the writeback request is performed at an increased latency, which may reduce cell and/or memory system power consumption but may not affect CPU 320 performance.

FIG. 3B illustrates the exemplary memory system and/or method 300 of FIG. 3A, and further includes a row buffer 335 for the molecular memory device 315. Referring now to FIG. 3B, the CPU 320 sends a request for a particular memory block Y to the L2 cache 330, resulting in a cache miss. Responsive to the cache miss, the L2 cache 330 sends a fetch request for block Y to the row buffer 335 of the molecular memory device 315. As the row buffer 335 also does not contain block Y, a row buffer miss results, and a request to fetch block Y is sent to the variable-latency write circuit 340 responsive to the row buffer miss. However, in order to load block Y into the row buffer 335, the page currently stored in the row buffer 335 is first closed. As used herein, a "page" may be an entire and/or a partial row of memory that is held in a row buffer, such as the row buffer 335. "Opening" a page refers to reading the page from the memory device into the row buffer, while "closing" a page refers to writing the page from the row buffer back to the memory device. Since operations at the CPU 320 may await results of the fetch request, the variable-latency write circuit 340 provides a bitline voltage at the second (larger) voltage differential to the molecular memory device 315 to close the current page via a "fast" write. The page containing block Y is then opened from the molecular memory device 315 into the row buffer 335, and block Y is transferred from the row buffer 335 to the L2 cache 330, which may reduce and/or minimize wait time for the CPU 320.

However, as shown in FIG. 3B, the L2 cache 330 is full. Thus, a block of memory in the L2 cache 330 is written back to the molecular memory device 315 so that block Y can be transferred to the L2 cache 330. Block P in the L2 cache 330 is "dirty," and therefore may be updated in the molecular memory device 315 to maintain consistency between the L2 cache 330 and the molecular memory device 315. Accordingly, a request to writeback block P is sent from the L2 cache 330 to the row buffer 335. As the row buffer 335 does not contain block P, a row buffer miss results, and a request to close the current page and open the page containing block P is sent to the variable-latency write circuit 340 responsive to the row buffer miss. Since operations at the CPU 320 may not be awaiting results of the writeback request, the variable-latency write circuit 340 provides a bitline voltage at the first (smaller) voltage differential to the molecular memory device 315 to close the current page via a "slow" write, which may reduce cell and/or memory system power consumption. The page containing block P is then opened from the molecular memory device 315 into the row buffer 335 to writeback block P. Thus, an exemplary memory system and/or method as illustrated in FIG. 3B operates according to an "open-page" policy, as the page currently stored in the row buffer 335 remains in the row buffer 335 (i.e., remains "open") until a row buffer miss results.

In some embodiments, when a page is being closed via a "slow" write (responsive to a row buffer miss by a writeback request), a fetch request from the L2 cache 330 may arrive at the memory request queue before the page-closing has finished. In such instances, the writeback request may be preempted by the subsequently received fetch request. For example, if the fetch request "hits" in row buffer 335, the page-closing may be terminated via the variable-latency write circuit 340, leaving the page in the row buffer 335 to service the fetch request. On the other hand, if the fetch request "misses" in row buffer 335, the variable-latency write circuit 340 may dynamically provide the bitline voltage at the second (larger) voltage differential, closing the current page via a "fast" write to service the newly-arrived fetch request.

FIG. 3C illustrates exemplary memory systems and/or methods 300 according to some embodiments of the present invention which operate according to a "close-page" policy. In a close-page policy, the page currently stored in the row buffer 335 may be closed immediately after the memory request is executed, rather than responsive to a row buffer miss. Referring now to FIG. 3C, the CPU 320 sends a request for a particular memory block Y to the L2 cache 330, resulting in a cache miss. Responsive to the cache miss, the L2 cache 330 sends a fetch request for block Y to the row buffer 335 of the molecular memory device 315. However, the row buffer 335 is empty, and thus does not contain block Y. As such, a row buffer miss results, and a request to fetch block Y is sent to the molecular memory device 315. The page containing block Y is then opened from the molecular memory device 315 into the empty row buffer 335, and block Y is transferred from the row buffer 335 to the L2 cache 330. In some embodiments, block Y may be transferred from the row buffer 335 to the L2 cache 330 via a read data buffer, such as the read data buffer 245 of FIG. 2. The page containing block Y is then closed, leaving the row buffer 335 empty for the next memory request. If the next request to be executed is a writeback request, the variable-latency write circuit 340 provides a bitline voltage at the first (smaller) voltage differential to the molecular memory device 315 to close the current page via a "slow" write, since operations at the CPU 320 may not be delayed by the page-closing. Alternatively, if the next request to be executed is a fetch request, the variable-latency write circuit 340 provides the bitline voltage at the second (larger) voltage differential to close the current page via a "fast" write, which may reduce and/or minimize wait time for the CPU 320. As a further alternative, if the memory request queue does not contain any pending memory requests, the variable-latency write circuit 340 provides the bitline voltage at the first (smaller) voltage differential to close the current page via a "slow" write. If a new fetch request arrives before the page-closing has finished, the "slow" write may be preempted by the subsequently received request, as described above with reference to FIG. 3B.

Still referring to FIG. 3C, as the L2 cache 330 is full, a block of memory in the L2 cache 330, for example block P, is evicted so that block Y can be transferred to the L2 cache 330. As block P of the L2 cache 330 is "dirty," a request to writeback block P is sent from the L2 cache 330 to the row buffer 335. Since the row buffer 335 is now empty, a row buffer miss results, and a request to open the page containing block P is sent to the molecular memory device 315. The page containing block P is then opened from the molecular memory device 315 into the row buffer 335 to writeback block P. Once the writeback has been serviced, the page containing block P is closed, leaving the row buffer 335 empty for the next memory request. If the next request to be executed is a writeback request, the variable-latency write circuit 340 provides a bitline voltage at the first (smaller) voltage differential to close the current page via a "slow" write, which may reduce cell and/or memory system power consumption. On the other hand, if the next request to be executed is a fetch request, the variable-latency write circuit 340 provides the bitline voltage at the second (larger) voltage differential to close the current page via a "fast" write, which may improve performance. As a further alternative, if the memory request queue does not contain any pending memory requests, the variable-latency write circuit 340 provides the bitline voltage at the first (smaller) voltage differential to close the current page via a "slow" write. If a new fetch request arrives before the page-closing has finished, the "slow" write may be preempted by the subsequently received request, as described above with reference to FIG. 3B.

In addition, exemplary memory systems and/or methods according to some embodiments of the present invention may operate according to a modified open-page policy, in which a page currently stored in the row buffer 335 may be written back to the molecular memory device 315 and may also remain "open" in the row buffer 335 until a row buffer miss occurs. As such, the current page may be preemptively updated in the molecular memory device 315 so that if the next memory request results in a row buffer miss, the page containing the desired memory block can be opened into the row buffer 335 without having to close the current page. This may improve performance as compared to an unmodified open-page policy. The current page in the row buffer 335 may be updated in the molecular memory device 315 at any time after the current page is first opened and before the next row buffer miss occurs. For example, the current page may be updated in anticipation of the next row buffer miss. More particularly, in some embodiments, the current page may be updated according to a prediction algorithm based on past memory reference behavior. Accordingly, at any time after the current page is first opened and before the next row buffer miss (and any number of times therebetween), the variable-latency write circuit 340 may provide the bitline voltage at the first voltage differential to update the molecular memory device 315 using a "slow" write, so as to reduce power without delaying the CPU 320. If a new fetch request arrives and misses in the row buffer before the update is finished, the variable-latency write circuit 340 may dynamically provide the bitline voltage at the second voltage differential, preempting the "slow" write as similarly described above with reference to FIG. 3B.

Exemplary operations for performing write operations in a memory device, such as the memory device 215 of FIG. 2 and/or the molecular memory device 315 of FIGS. 3A–C, in accordance with some embodiments of the present invention will now be described with reference to the flowcharts of FIGS. 4 and 5.

Figure 4:
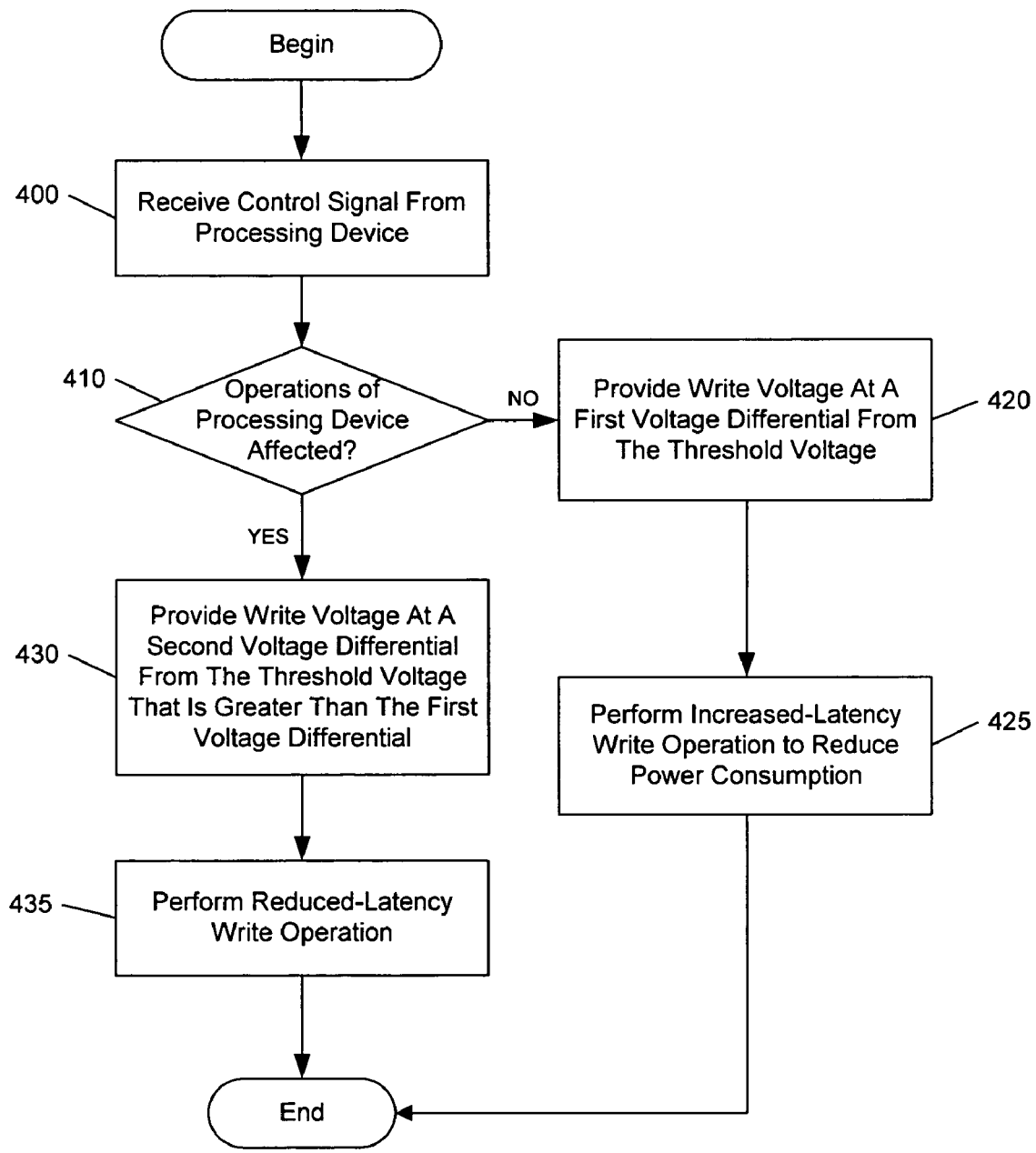
FIG. 4 is a flowchart illustrating exemplary operations for performing write operations in a memory device according to some embodiments of the present invention.
Figure 5:
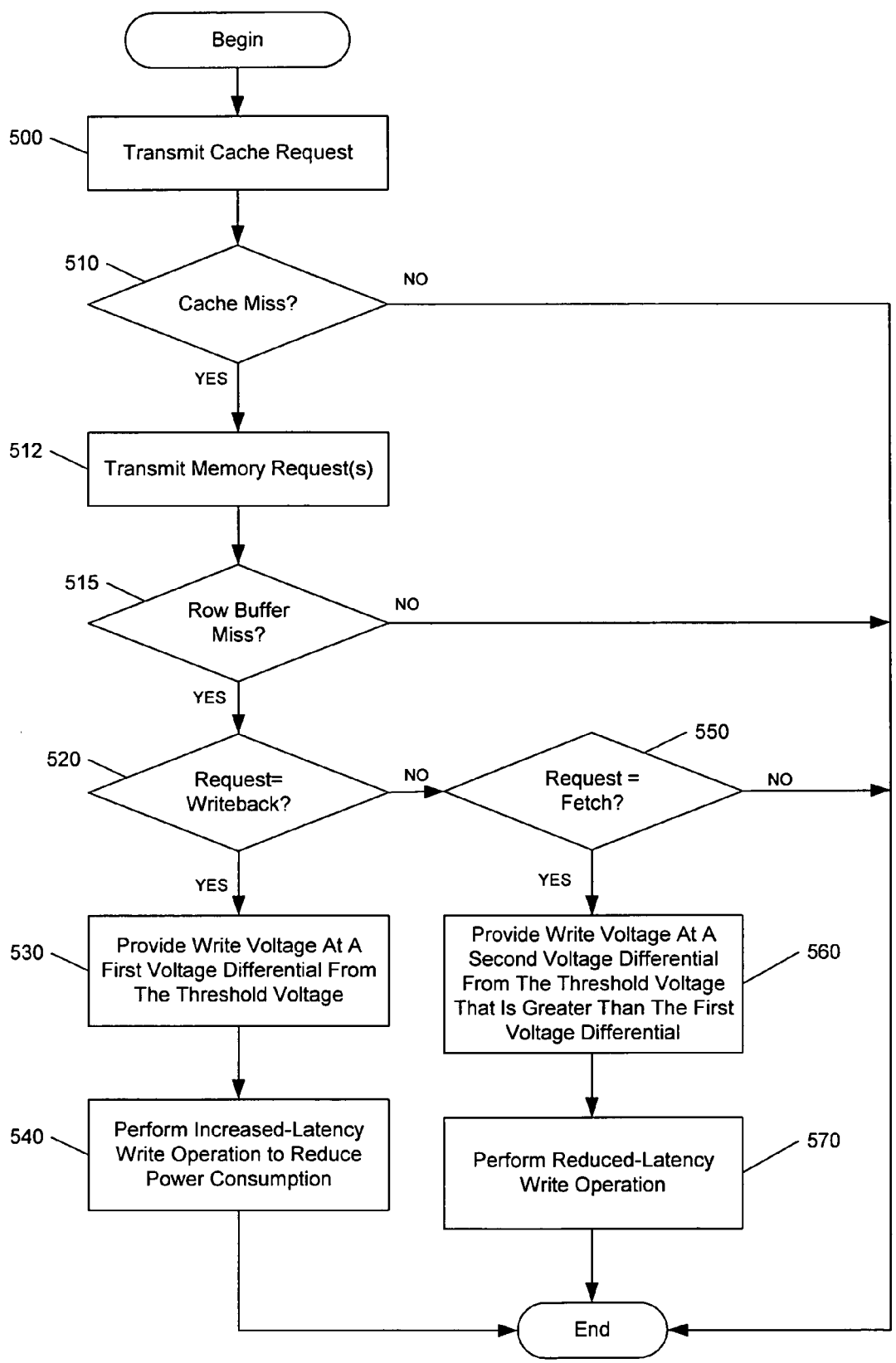
FIG. 5 is a flowchart further illustrating exemplary operations for performing write operations in a memory device according to some embodiments of the present invention.

Referring now to FIG. 4, exemplary operations for performing write operations in a memory device begin at block 400 where a control signal is received from a processing device, such as the processing device 120 of FIG. 1. As discussed above, the memory device may include a plurality of storage cells, such as the storage cells 130, configured to store a fixed charge or discharge the fixed charge when an applied write voltage is above or below a predetermined threshold voltage. In some embodiments, the storage cells may include charge storage molecules, such as porphyrin molecules and/or ferrocene molecules, and the threshold voltage may be an oxidation potential of the charge storage molecules. The processing device may include a central processing unit (CPU) and cache memory. The control signal may be a memory request from the processing device, such as a fetch request or a writeback request. Based on the received control signal, it is determined whether operations of the processing device are affected and/or delayed by the received control signal at block 410. For example, further performance of the CPU of the processing device may be contingent on execution of a transmitted memory request.

Still referring to FIG. 4, if operations of the processing device are not affected by the received control signal, a write voltage is provided at a first voltage differential from the threshold voltage of the storage cells at block 420. Accordingly, an increased-latency write operation is performed at block 425. Thus, in some embodiments, cell power consumption may be reduced when write speed may not affect processing device performance. In contrast, if operations of the processing device are affected by the received control signal, the write voltage is provided at a second voltage differential from the threshold voltage that is greater than the first voltage differential at block 430. As such, a reduced-latency write operation is performed at block 435. Thus, write speed may be increased when it may have an effect on processing device performance.

Additional operations for performing write operations in accordance with some embodiments of the present invention will now be described with reference to the flowchart of FIG. 5. Referring now to FIG. 5, operations begin at block 500 where a cache request is transmitted from a processing device, such as from the CPU 220 of the processing device 205 of FIG. 2. If the cache request can be executed at the cache memory of the processing device (block 510), operations end. If the cache request cannot be executed at the cache memory, a memory request is transmitted from the cache memory at block 512, such as from the L2 cache 230 of FIG. 2. The memory request may be a fetch request and/or a writeback request. If the memory request can be executed at the row buffer of the memory device (block 515), operations end.

On the other hand, if the cache request results in a cache miss (block 510) and the memory request results in a row buffer miss (block 515), it is determined if the memory request is a writeback request at block 520. If the memory request is a writeback request, a write voltage is provided at a first voltage differential from the threshold voltage of the storage cells at block 530. Accordingly, as a writeback request may not directly delay operations of the processing device, an increased-latency write operation is performed at block 540, which may reduce cell power consumption. Alternatively, if the memory request is not a writeback request, it is determined if the memory request is a fetch request at block 550. If so, the write voltage is provided at a second voltage differential from the threshold voltage that is greater than the first voltage differential at block 560. As such, a reduced-latency write operation is performed at block 570. As a fetch request may directly delay operations of the processing device, the reduced-latency write operation may reduce and/or minimize processing device wait time.

Accordingly, in some embodiments of the present invention, a hybrid write policy is provided that dynamically varies the write voltage applied to a storage cell in a memory device. As such, the voltage differential between the applied write voltage and the threshold voltage of the storage cell is also dynamically varied, in order to perform a variable-latency write operation that charges and/or discharges the storage cell.

Additional description of some embodiments of the present invention will now be provided with reference to FIGS. 6 through 24. In particular, embodiments of the present invention may include systems, methods, and devices for writing to a molecular memory device, such as ZettaRAM™.

1. Introduction

ZettaRAM™ is a memory technology developed as a potential replacement for conventional DRAM. Accordingly, these memories may be based on conventional DRAM architectures, and as such, may include address decoders, wordlines, access transistors, bitlines, sense amps, etc. However, the conventional capacitor in each DRAM cell is replaced with "charge-storage" molecules to form a molecular capacitor, as further described in "Molecular Approach Toward Information Storage Based on the Redox Properties of Porphyrins in Self-Assembled Monolayers" by K. M. Roth, N. Dontha, R. B. Dabke, D. T. Gryko, C. Clausen, J. S. Lindsey, D. F. Bocian, and W. G. Kuhr, J. Vac. Sci. Technology B, 18, 2359–2364, 2000.

In a molecular capacitor, the amount of charge deposited (which may be used for reliable sensing) is independent of write voltage. In other words, there is a discrete threshold voltage above/below which the device is fully charged/discharged. Decoupling charge from voltage may enable manipulation of the device via arbitrarily small bitline swings, which in turn may save energy. However, while charge is voltage-independent, speed is voltage-dependent. As such, operating too close to the threshold may cause molecules to overtake peripheral circuitry as the overall performance limiter. Nonetheless, ZettaRAM™ may offer a speed/energy trade-off for architectural management of memory where DRAM may be inflexible.

In particular, the aggregate molecular capacitor may retain potential advantages of the underlying nanotechnology from which it is derived.

First, in a process called self-assembly, the thousands of molecules that make up a molecular capacitor can automatically arrange themselves into a single, uniform, dense layer (monolayer). Moreover, the charge density of the molecular capacitor may be greater than the charge density of a conventional capacitor. These two factors—self-assembly and high charge density—may allow for increasing the density of DRAM in a cost-effective manner. While conventional DRAM can be scaled, the costs may potentially be high due to the potential need for many complex masks for constructing elaborate three-dimensional capacitor structures. These complex structures may be needed in order to reduce the cell area while maintaining a minimum amount of charge that can be sensed. On the other hand, the aggregate molecular capacitor may not require complex masks because the same amount of charge (or more) can be packed into the desired area via a self-assembled monolayer.

Second, the molecular capacitor can benefit from "molecular engineering"—i.e., engineering the properties of constituent molecules with remarkable precision. In other words, synthetic chemists can precisely tune key properties of the molecules through the choice of molecular "groups" and "linkers", such as the speed with which electrons can be added/removed (affecting the speeds of reading and writing), the voltage at which electrons can be added/removed (affecting read and write power consumption), retention time (how slowly charge decays), and/or monolayer density (affecting charge density and thus overall memory density). Engineering a molecule can be highly precise, predictable/repeatable, and can be done in inexpensive laboratories, whereas tuning bulk properties of semiconductors may be expensive and subject to many environmental factors. In addition, there may be tremendous flexibility in the selection of performance (by way of electron transfer rates), power consumption (by way of oxidation/reduction potentials), and other attributes of molecular capacitors, although there are certainly tradeoffs among these attributes.

As described in detail below, the potential benefits of ZettaRAM™ may extend beyond reducing fabrication complexity and costs. For example, managed ZettaRAM™ can operate with significantly lower power than contemporary DRAM, with little sacrifice in performance.

Bitline energy consumption can constitute up to 96% of overall energy consumption in DRAM, as noted in "VLSI Memory Chip Design" by K. Itoh, Springer Series in Advanced Microelectronics, 2001, pp. 117–123. Bitline energy may be consumed when there is a voltage transition on the bitline, and may depend on the magnitude of the voltage change. The voltages for charging (writing a "1") and discharging (writing a "0") may be closer together for a molecular capacitor than for a conventional capacitor. This means the voltage swings in ZettaRAM™ may be smaller than the voltage swings in conventional DRAM, for the same charge density (i.e., the same amount of charge deposited within the same cell area).

Figure 6:
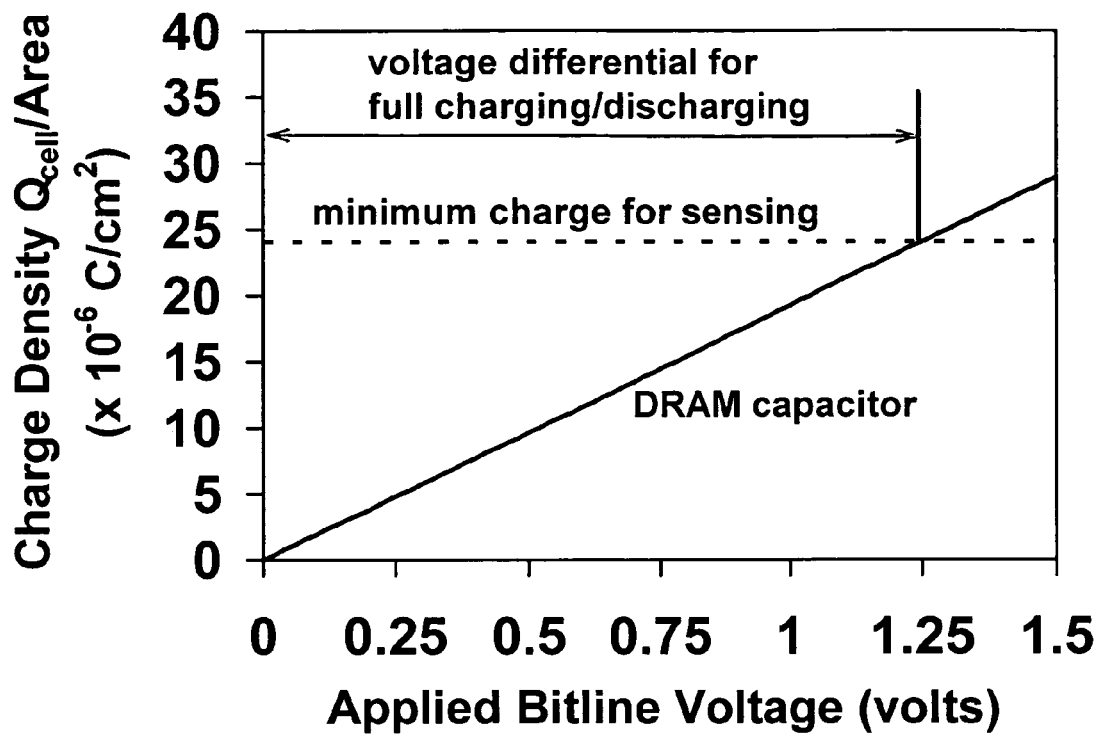
FIG. 6 is a graph illustrating device characteristics of a conventional DRAM capacitor.
Figure 7:
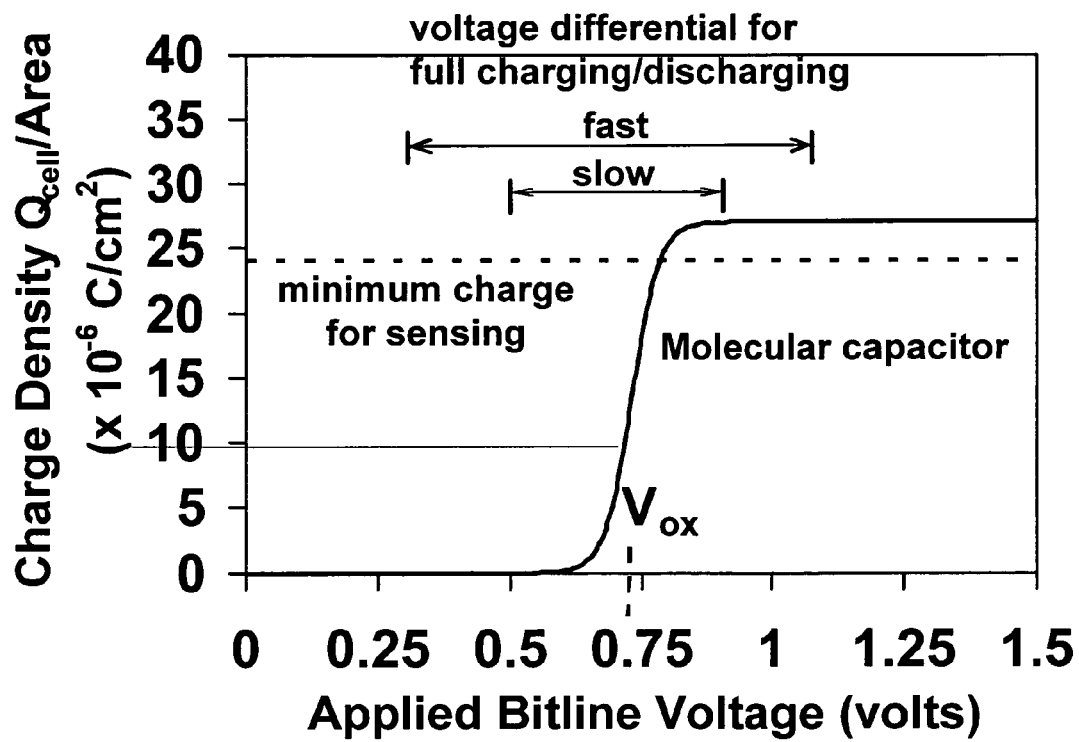
FIGS. 7 and 8 are graphs illustrating device characteristics of a molecular capacitor.

This distinction is highlighted in FIG. 6 and FIG. 7. The graph in FIG. 6 shows charge density (charge per unit area) as a function of write voltage, for a conventional capacitor used in a DRAM device. Using charge per unit area may ensure that comparisons are made with respect to the same cell area. The amount of charge deposited on a conventional capacitor may depend linearly on the applied write voltage (Q=CV). Thus, there may be a minimum write voltage below which not enough charge is deposited on the conventional capacitor for the sense amplifier to reliably detect a "1" during a later read operation. The minimum charge density for reliable sensing is illustrated by the dashed horizontal line in FIG. 6. Based on where this line intersects the graph for the conventional capacitor, the minimum voltage for writing a "1" appears to be around 1.25 V.

Thus, the overall voltage differential between fully charging and discharging a conventional capacitor may be about 1.25 V, as shown in FIG. 6. The actual magnitude of bitline transitions may depend on the nature of consecutive operations, of which there are three types—read, write 0, and write 1. In Section 3.4, individual transitions in depth for conventional DRAM and ZettaRAM™ are further analyzed. Nonetheless, the overall voltage differential can be a predictor of energy consumption.

The graph in FIG. 7 shows charge density as a function of write voltage for a molecular capacitor used in ZettaRAM™. As shown in FIG. 7, the relationship is nonlinear and centers around a voltage called $V_{ox}$, the oxidation potential. When the write voltage is above $V_{ox}$, the molecules are charged. Conversely, when the write voltage is below $V_{ox}$, the molecules are discharged. Notice that, to write a "1", sufficient charge is deposited when the applied voltage is only slightly above $V_{ox}$. Likewise, to write a "0", the molecular capacitor can be completely discharged at voltages only slightly below $V_{ox}$. The minimum voltage differential between full charging and full discharging may be quite small, thus reducing the magnitude of bitline voltage swings. However, charging/discharging the molecules becomes exponentially slower the closer the applied voltage is to $V_{ox}$. In other words, ZettaRAM™ presents a performance/energy tradeoff that may not be provided by conventional DRAM. As shown in FIG. 7, the voltage differential can be increased or decreased to favor either performance or energy, respectively.

Figure 8:
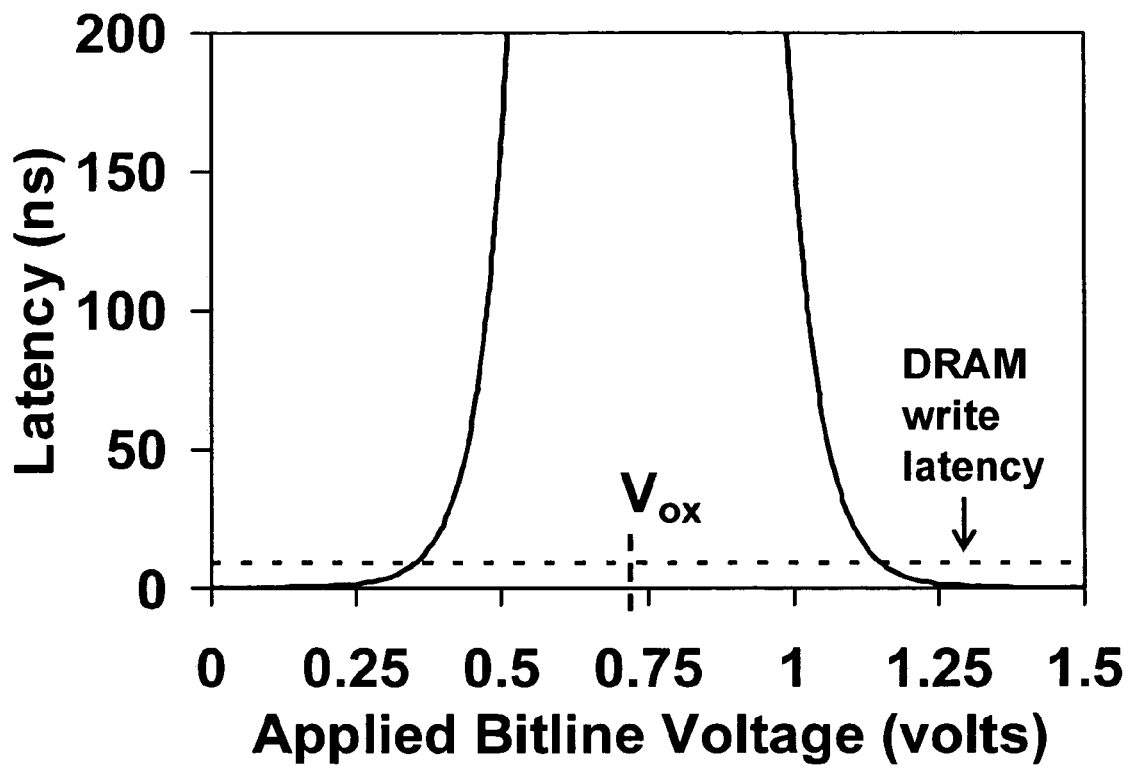

To complete the overall picture, the graph in FIG. 8 shows the intrinsic latency of charging/discharging the molecules as a function of voltage. The latency increases exponentially as the voltage approaches $V_{ox}$. Superimposed on the graph of FIG. 8 is the DRAM write latency, as shown by the dashed line. SPICE simulations, which are presented below, show that the overall speed of ZettaRAM™ can be determined by either the speed of charging/discharging the molecules or the conventional peripheral circuitry used to access the molecular capacitor, whichever is slower. Accordingly, as shown in FIG. 8, similar performance to conventional DRAM can be achieved if write voltages above 1.15 V (write "1") and below 0.35 V (write "0") are used, since the intrinsic speed of the molecules may not be the bottleneck in these regions. Note that, although only writing is described thus far, reading is tantamount to writing a "0". The molecular capacitor is read by discharging it, similar to reading a conventional capacitor.

While FIG. 7 shows that smaller voltage swings are possible for ZettaRAM™, FIG. 8 shows that latencies may increase disproportionately. Some embodiments of the present invention provide memory system policies that can tap at least some of the energy savings potential without the need to significantly sacrifice system-level performance.

First, a hybrid write policy is applied in which slow writes delay non-critical requests and fast writes expedite critical requests. As used herein, a "critical" request is a request that can potentially impact overall system speed, and a "non-critical" request is a request that may not impact overall system speed. Each memory bank queues pending cache block fetch requests and cache block writeback requests, received from the L2 cache. A request is serviced from an open memory page—i.e., from an entire row of the memory bank held in the row buffer. Thus, if the needed page is not open, then the current open page is first closed (write operation) before opening the desired page (read operation). In some embodiments, the hybrid write policy is applied to the current page as it is closed (written back to the memory array). If the L2 request that misses in the row buffer is a writeback request, then the current page is closed via a slow write (low energy). L2 writebacks may not directly stall the processor; thus, they may be non-critical and can be deferred by slowly closing the current page, thereby conserving energy. On the other hand, if the L2 request that misses in the row buffer is a fetch, then the current page is closed via a fast write (high energy). L2 fetches may typically stall the processor, even with out-of-order execution, because the instruction scheduling window may not be large enough to compensate for the memory round-trip latency.

Statistically, writeback requests are responsible for most of the misses in the row buffer. In other words, more pages are closed on behalf of writeback requests (78% of closed pages) than fetch requests (22% of closed pages). Therefore, conserving energy when closing pages on behalf of writeback requests can achieve significant energy savings potential (34% savings vs. 41% potential savings), as described below.

Moreover, because writebacks may offer scheduling flexibility, there may be room to explore other design parameters. Although deferred writebacks may not directly stall the processor, they can fill up the memory controller's request queues, potentially stalling critical fetch requests. Accordingly, the effects of queue size and memory access reordering (where fetch requests bypass queued writeback requests) can be investigated. Also, an eager writeback policy in the L2 cache can be considered to more evenly spread out writeback requests and thereby decrease the frequency of queue-full stalls. Eager writebacks may have little effect in the baseline system (for the SPEC2K benchmarks used), but can be surprisingly effective for eliminating performance degradation otherwise caused by delayed writebacks. Further discussion of eager writebacks is provided in "Eager Writeback—a Technique for Improving Bandwidth Utilization" by H. S. Lee, G. S. Tyson, M. K. Farrens, 33$^{rd}$ Int'l Symposium on Microarchitecture, pp. 11–21, 2000.

Below, results are summarized within the context of three alternative high-performance designs.

1. A ZettaRAM™ memory system employing only fast writes may yield similar system-level performance and energy as the baseline DRAM memory system.
2. A ZettaRAM™ memory system employing slow writes for pages closed by non-critical requests according to some embodiments of the present invention may achieve 34% bitline energy savings with less than 1% performance degradation, if the request queues are increased from 4 entries to 64 entries and memory access reordering is used. However, enlarging the queues may increase system cost (as each entry contains an entire cache block) and complexity. Regarding complexity, fetch requests that bypass queued writeback requests (memory access reordering) may first search the queue for possible address matches.
3. A ZettaRAM™ memory system employing slow writes for pages closed by non-critical request according to some embodiments of the present invention may achieve 34% bitline energy savings with less than 1% performance degradation, if the L2 cache uses the eager writeback policy. This may be achieved without enlarging request queues with respect to the baseline system. This may be significant in terms of keeping the cost and complexity of the memory controller the same as the baseline. In the eager writeback policy, a dirty block is written back as soon as it becomes the least-recently-used (LRU) block in the set. LRU information is already available in the set-associative L2 cache.

The remainder of the present application is organized as follows. Section 2 provides background on the molecular capacitor, including basic read/write operation, a SPICE device model, and a derivation of charge density as a function of write voltage. Section 3 presents SPICE results, namely, read/write latencies and operating voltages for both ZettaRAM™ and DRAM. Section 4 describes an experimental framework for system-level experiments. Results are presented in Section 5. Finally, Section 6 provides conclusions.

Figure 9:
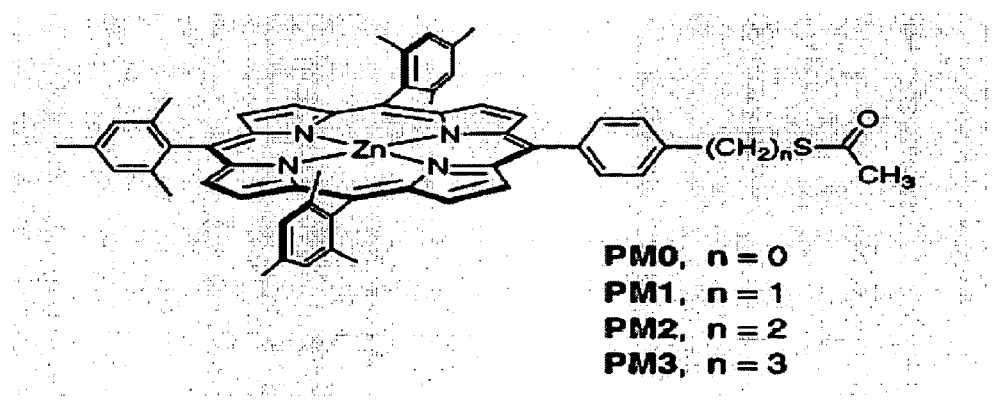
FIG. 9 illustrates a porphyrin molecule that may be used in memory systems, devices, and methods according to some embodiments of the present invention.

2. Molecular Capacitor 2.1 Molecule Description and Reading/Writing the Molecular Capacitor A ZettaRAM™ memory cell may be identical to a conventional DRAM memory cell, except that the conventional capacitor of the DRAM memory cell is replaced with a new capacitor-like device based on a self-assembled monolayer (SAM) of porphyrin molecules sandwiched between two electrodes. An individual porphyrin molecule is shown in FIG. 9. The molecule can be positively charged by removing a single electron from the redoxactive part of the molecule, referred to as oxidation. As such, oxidation corresponds to "writing" a logic 1. An electron can be added back to the positively charged molecule to return it to the uncharged state, referred to as reduction. Reduction corresponds to "writing" a logic 0.

The molecule is oxidized when the voltage applied across the molecule is greater than the oxidation potential, which is 0.73 V for the molecule types discussed herein. It is reduced when the applied voltage is below the oxidation potential. More particularly, oxidation and reduction may be taking place simultaneously, as any chemical reaction can be considered a combination of forward and reverse reactions. Equilibrium may be reached when the rates of the forward and reverse reactions are equal. Although the rates may be balanced at equilibrium, the molecule may have a strong tendency towards either the oxidized state or the reduced state, depending on whether the applied voltage is above or below the oxidation potential, respectively.

Like reading conventional DRAM, reading ZettaRAM™ is generally destructive. In other words, the molecules in a molecular capacitor are discharged (if initially charged) to read the state of the molecules. This is achieved by reducing the molecules, i.e., by precharging the bitline to a voltage below the oxidation potential. The state of the molecules is sensed by detecting the presence (or absence) of a small voltage change on the bitline as the molecules are discharged (unless neutral), which may be procedurally similar to sensing in conventional DRAMs.

With regard to reading, the bitline can be precharged to a specific voltage below the oxidation potential called the open circuit potential (OCP~0.2–0.3V), as discussed in "Characterization of Charge Storage in Redox-Active Self-Assembled Monolayers" by K. M. Roth, J. S. Lindsey, D. F. Bocian, and W. G. Kuhr, Langmuir, 18, 4030–4040, 2002. The molecular capacitor is actually an electrochemical cell (similar to a battery), in which the redox species is the porphyrin molecules. The OCP is a well-known artifact of electrochemical cells. Reading at the OCP prevents discharging of the "double-layer capacitance", an internal capacitance, which would otherwise drown out discharging of the molecules themselves.

2.2 SPICE Model of Molecular Capacitor

The oxidation/reduction reactions are shown below, where A is the porphyrin molecule.

$$A \leftrightarrow A^+ + e^- \quad (EQ\ 1)$$

Further discussion of oxidation/reduction reactions in porphryin molecules can be found in "Comparison of Electron-Transfer and Charge-Retention Characteristics of Porphyrin-Containing Self-Assembled Monolayers Designed for Molecular Information Storage" by K. M. Roth, D. T. Gryko, P. C. Clausen, J. Li, J. S. Lindsey, W. G. Kuhr, and D. F. Bocian, J. Phys. Chem. B, 106, 8639–8648, 2002. In non-equilibrium (charging or discharging), the net rate of oxidation or reduction—i.e., the net current—is exponentially dependent on the difference between the applied voltage and the oxidation potential. This current is expressed by the Butler-Volmer kinetic model, shown below, and is the basis of the present SPICE model.

$$I = F \cdot k^0 \cdot \left( [A] \cdot e^{(1-\alpha)\left(\frac{F}{RT}\right)(V-V_{ox})} - [A^+] \cdot e^{-\alpha\left(\frac{F}{RT}\right)(V-V_{ox})} \right) \quad (EQ\ 2)$$

The above parameters are defined as follows: $k^0$=standard rate constant, $\alpha$=transfer coefficient, F=Faraday constant, R=gas constant, T=temperature, V=applied voltage, $V_{ox}$=oxidation potential, [A]=concentration of non-oxidized molecules (in moles per unit area), and [$A^+$]=concentration of oxidized molecules. Additional description of the Butler-Volmer kinetic model can be found in "Electrochemical Methods: Fundamentals and Applications" by A. J. Bard and L. R. Faulkner, John Wiley and Sons, 2001, pp. 92–96.

The current I determines the intrinsic speed of reading and writing the molecules. When the SPICE model of the molecular capacitor is integrated into a complete memory circuit, the overall speed may be determined by several interacting components. That is, like other SPICE device models (e.g., transistor, resistor, capacitor, etc.), when the device model of the molecular capacitor is integrated into a larger circuit, the SPICE simulator correctly solves for currents and voltages at all nodes, accurately reflecting the interaction between the molecular capacitor and the rest of the circuit.

Figure 10A:
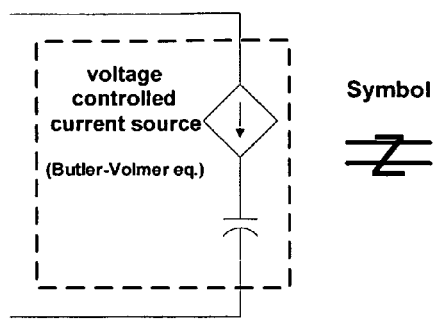
FIG. 10A is a schematic diagram illustrating a SPICE device model of a molecular capacitor that may be used in memory systems, devices, and methods according to some embodiments of the present invention.

FIG. 10A shows the SPICE model of the molecular capacitor. The voltage-controlled current source implements EQ 2. The current depends on three variables, [A], [A$^+$], and V.

Figure 10B:
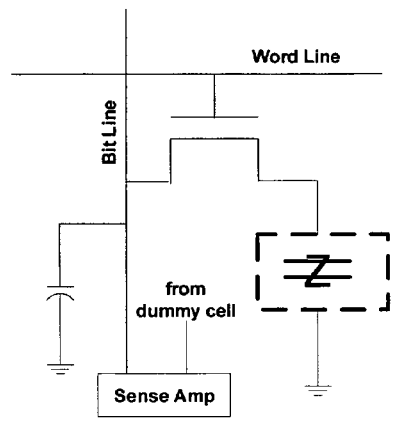
FIG. 10B is a schematic diagram illustrating a SPICE device model of a molecular memory circuit that may be used in memory systems, devices, and methods according to some embodiments of the present invention.

FIG. 10B shows the SPICE model of the molecular capacitor integrated into a larger SPICE model of the ZettaRAM™ architecture, including bitline, wordline, access transistor, and sense amp.

Figure 10C:
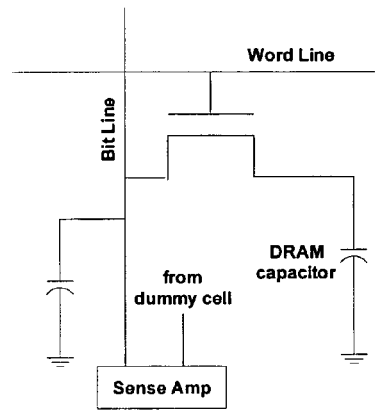
FIG. 10C is a schematic diagram illustrating a SPICE device model of conventional DRAM circuit.

FIG. 10C shows the SPICE model of the DRAM architecture. A difference between the ZettaRAM™ and DRAM SPICE models is the type of capacitor used inside the cell (i.e., molecular vs. conventional, respectively).

2.3 Highly Non-linear Capacitance: Charge Density Independent of Write Voltage

The oxidation/reduction reactions shown in EQ 1 may eventually reach an equilibrium. The net current may be zero at this equilibrium. The amount of charge ($Q_{cell}$=[A$^+$]) at equilibrium can be derived as a function of the write voltage, by substituting I=0 in the Butler-Volmer equation (EQ 2). (This provides the effective capacitance of the molecular capacitor, since capacitance expresses Q as a function of V.) Doing so yields the following $Q_{cell}$ (V):

$$Q_{cell}(V) = [A]_0 \cdot \left[ \frac{1}{1 + e^{-\frac{F}{RT}(V - V_{ox})}} \right] \quad (EQ\ 3)$$

[A]$_0$ is the total molecule concentration, equal to the sum of [A] and [A$^+$]. EQ 3 is the basis for the charge density graph shown earlier in FIG. 7. The exponential term in the denominator becomes negligible as V is increased slightly above $V_{ox}$, such that the equilibrium charge deposited on the molecular capacitor is largely independent of write voltage, for voltages sufficiently higher than $V_{ox}$. This finding means that the molecular capacitor can be nearly fully charged over a comparatively wide range of write voltages. Thus, write voltage can be tuned and perhaps even dynamically adjusted to manage the bitline-energy/write-speed tradeoff, without sacrificing the ability to sense the device, since the deposited charge is the same independent of write voltage. However, the speed of writing is affected by write voltage, as described earlier in Section 2.2. Conventional DRAM may not provide this flexibility, because the amount of deposited charge may depend linearly on the write voltage, such that reliable sensing may place a lower bound on the write voltage.

3. SPICE Results

In this section, SPICE simulations in a 0.18μ technology are used to determine (1) operating voltages and (2) read/write latencies, for both ZettaRAM™ and DRAM. A 10:1 ratio is assumed between bitline capacitance and cell capacitance, as discussed in "Trends in Low-Power RAM Circuit Technologies" by K. Itoh, K. Sasaki, Y. Nakagome Proc. of the IEEE, 83(4):524–543, April 1995, and sense amps are designed accordingly. Sense amp designs are based on the discussion in "VLSI Memory Chip Design" by K. Itoh., Springer Series in Advanced Microelectronics, 2001, p. 403.

3.1 DRAM

Figure 11:
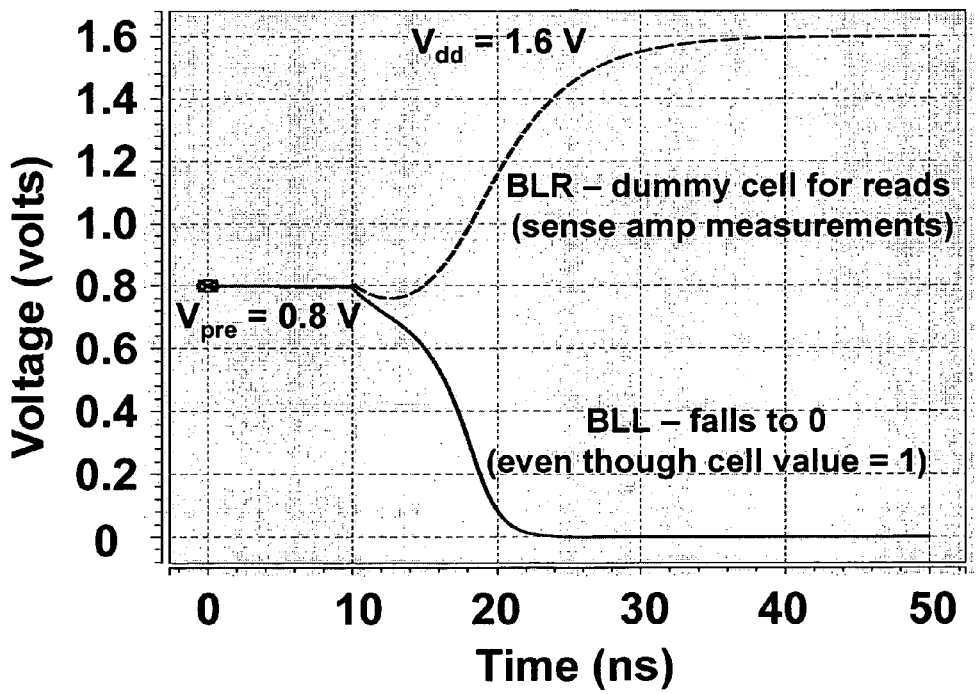
FIG. 11 is a graph illustrating write voltages in a conventional DRAM capacitor.

First, a lower bound on the DRAM write voltage (for writing a "1") is experimentally determined, below which not enough charge is deposited on the conventional capacitor for sensing. This lower bound on write voltage is $V_{d\_write\_1}$. Searching in increments of 0.05 V, it is determined that $V_{d\_write\_1}$=1.25 V. The graph in FIG. 11 shows that writing the DRAM capacitor at 1.2 V may cause sensing to fail during a later read operation, since there may be too little charge.

Next, the write latency of DRAM is determined. Although not illustrated, SPICE produces a write latency of 8.6 ns for $V_{d\_write\_1}$=1.25 V.

Figure 12:
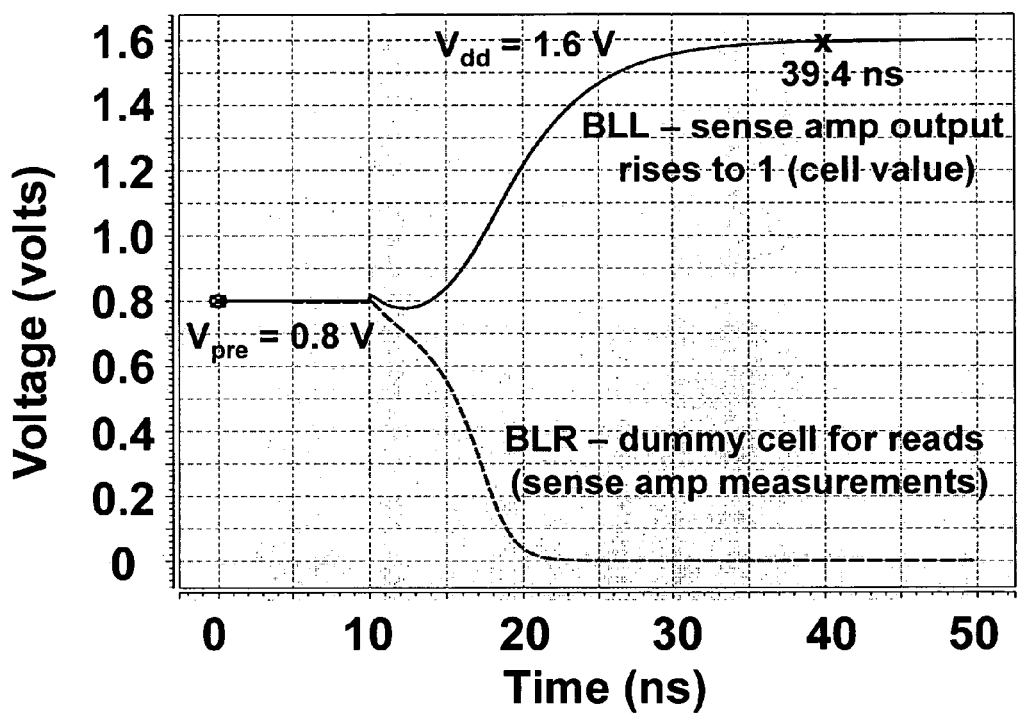
FIG. 12 is a graph illustrating read latency in a conventional DRAM capacitor.

Finally, the read latency of DRAM is determined. SPICE produces a read latency of 29 ns, as shown in FIG. 12.

3.2 ZettaRAM™

Figure 13:
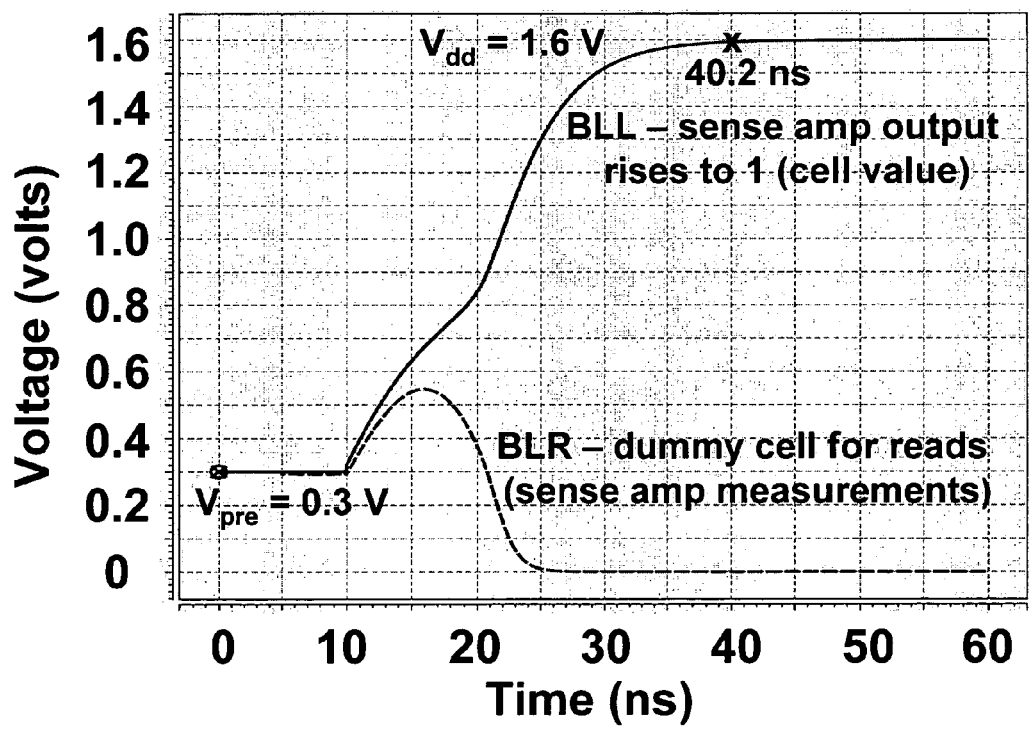
FIG. 13 is a graph illustrating write voltages in a molecular capacitor that may be used in memory systems, devices, and methods according to some embodiments of the present invention.

In the previous subsection, it was shown that a conventional capacitor in DRAM may not be sufficiently charged below 1.25 V, for correct sensing during a later read operation. On the other hand, writing the molecular capacitor at a voltage as low as 1.0 V (and perhaps even lower) results in correct sensing during a later read operation, as shown in FIG. 13.

Next, the write latencies of ZettaRAM™ are determined as a function of the ZettaRAM™ write voltage, $V_{z\_write\_1}$. In the first experiment, the minimum write voltage for DRAM, $V_{d\_write\_1}$=1.25 V, is used. The ZettaRAM™ write latency at this voltage is 8.2 ns, similar to the DRAM write latency (8.6 ns) reported in the previous subsection. This means that, for $V_{z\_write\_1}$=$V_{d\_write\_1}$, the conventional peripheral circuitry used to access the molecular capacitor may be the speed limiter, rather than the intrinsic speed of the molecules.

Figure 14:
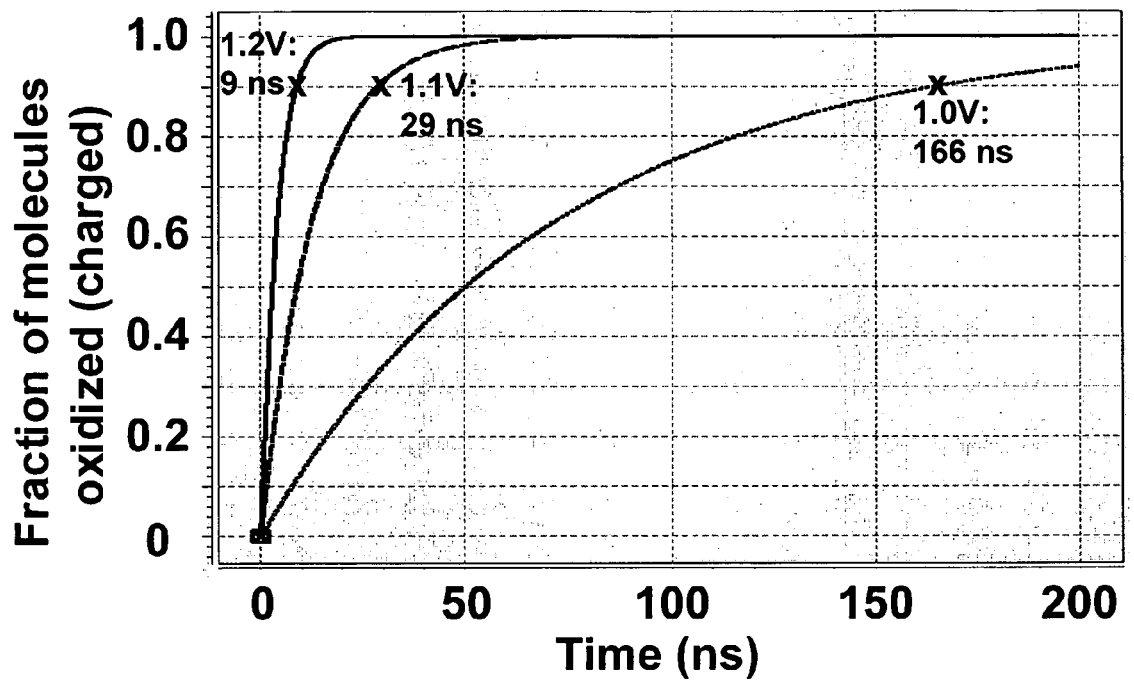
FIG. 14 is a graph illustrating write latency in a molecular capacitor that may be used in memory systems, devices, and methods according to some embodiments of the present invention.
Figure 15:
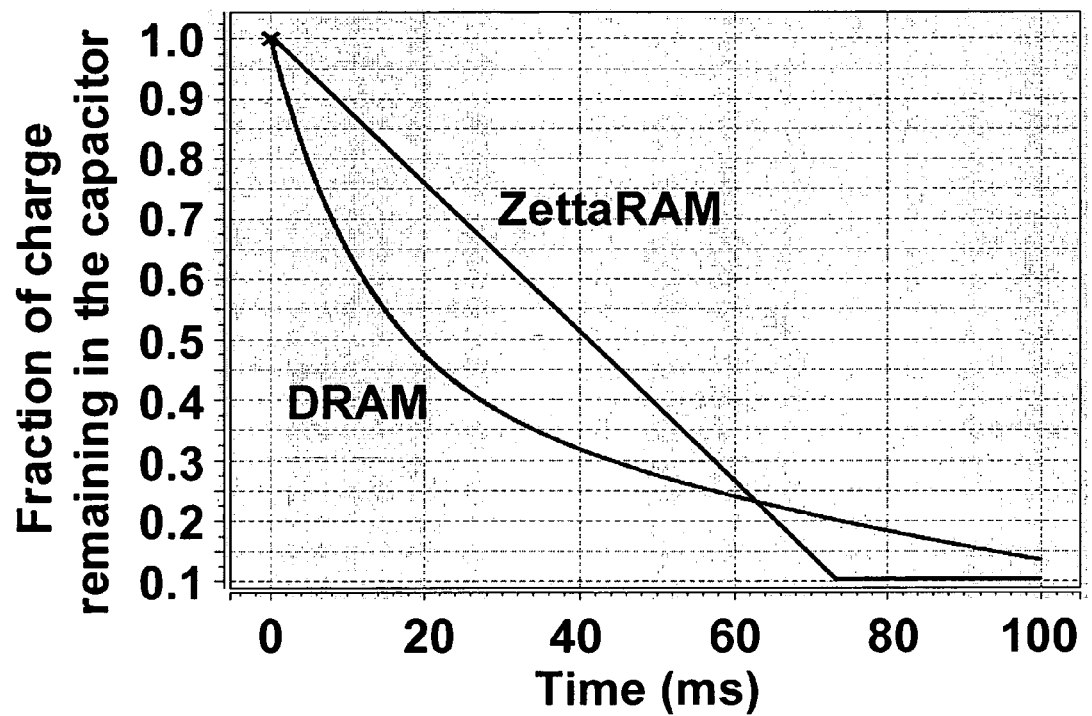
FIG. 15 is a graph illustrating retention times in a conventional DRAM capacitor and in a molecular capacitor that may be used in memory systems, devices, and methods according to some embodiments of the present invention.

The ZettaRAM™ molecular capacitor can be reliably written below 1.25 V, although the intrinsic speed of the molecules may begin to limit overall write speed at lower voltages. The SPICE results in FIG. 14 show increasing write latency with decreasing write voltage: 9 ns at 1.2 V, 29 ns at 1.1 V, and 166 ns at 1.0 V.

Reading may be competitive with conventional DRAM because the applied voltage is the OCP (0.3 V), which is sufficiently lower than $V_{ox}$ (0.73 V), such that the molecule current may be much faster than the sensing apparatus and thus may not limit the speed of reading. This is confirmed by SPICE simulations. The SPICE results in FIG. 13 show that the latency of reading ZettaRAM™ is 30 ns, similar to the read latency of DRAM (29 ns) measured in the previous subsection. Reading may be procedurally similar for conventional and molecular capacitors, as it may be based on sensing a small change in charge on the precharged bitline.

Reading the molecular capacitor is tantamount to writing "0", since the read voltage is below $V_{ox}$, fully discharging the molecular capacitor. So far, write voltages for writing a "1" have been discussed. For writing a "0", a single write voltage equal to the read voltage is considered, which is a fast write voltage. Bitline operations usually alternate between reading (open page) and writing (close page), so keeping the write "0" voltage the same as the read voltage may eliminate many bitline transitions altogether, as will be further discussed in Section 3.4.

3.3 Retention Time

The retention times of conventional and molecular capacitors may be comparable, because leakage may be an artifact of the access transistor and the initial stored charge may be similar. This is confirmed by the SPICE results shown in FIG. 15. For example, at 40 ms, the conventional capacitor and molecular capacitor retain 32% and 51% of the initial charge, respectively. The molecular capacitor demonstrates an improved decay curve at the beginning. The retention time of both memories can potentially be improved by applying a negative substrate bias, which may reduce the leakage current of the access transistor.

3.4 Comparison Summary and Voltage Transitions

As illustrated below, Table 1 summarizes similarities and differences between conventional DRAM and ZettaRAM™, in terms of operating voltages, read and write latencies, and capacitor area.

Table 2 shows bitline voltage transitions for DRAM and ZettaRAM™. Because L2 requests may be serviced from the page held in the row buffer, bitline operations may alternate between reading (open page) and writing (close page). This yields four valid transitions: read followed by write-0 or write-1, and write-0 or write-1 followed by read. The first row in the table shows the percentage breakdown of the four transitions. The benchmark mcf is shown (others show similar breakdowns). The second row shows the DRAM voltage differential for each transition, using the voltages derived in Section 3.1. Table entries for positive voltage transitions are highlighted, which are used in the energy accounting. Although the previous SPICE experiments used $V_{DD}$=1.6 V due to the available technology files (and a corresponding read precharge voltage of 0.8 V), for energy accounting $V_{DD}=V_{d\_write\_1}$ is used. This adjustment may reduce and/or minimize DRAM energy, by applying a lower voltage differential for the higher percentage write-0→read transitions. The third and fourth rows show ZettaRAM™ voltage differentials, using either fast or slow writes ($V_{z\_write\_1\_fast}$=1.2 V and $V_{z\_write\_1\_slow}$=1.0 V). Because the write-0 and read voltages are similar (as discussed in Section 3.2), two of the transitions incur no voltage change.

The lack of write-0→read transitions may give Zetta RAM™ a substantial energy advantage over conventional DRAM. Conceivably, the same strategy of unifying the read potential and the write-0 potential may be applicable in future DRAMs. To level the playing field, the DRAM is enhanced by lowering the read potential from $V_{DD}/2$ and raising the write-0 voltage from 0 V, both to $V_{ocp}$. (Like ZettaRAM™, the enhanced DRAM sense amp may sense logic "0" via the absence of a bitline shift.) This enhanced DRAM is the baseline for all architectural experiments. Voltage differentials for this baseline DRAM are shown in the last row of Table 2.

4. Experimental Framework

4.1 Memory Simulator: Modeling Timing

Figure 16:
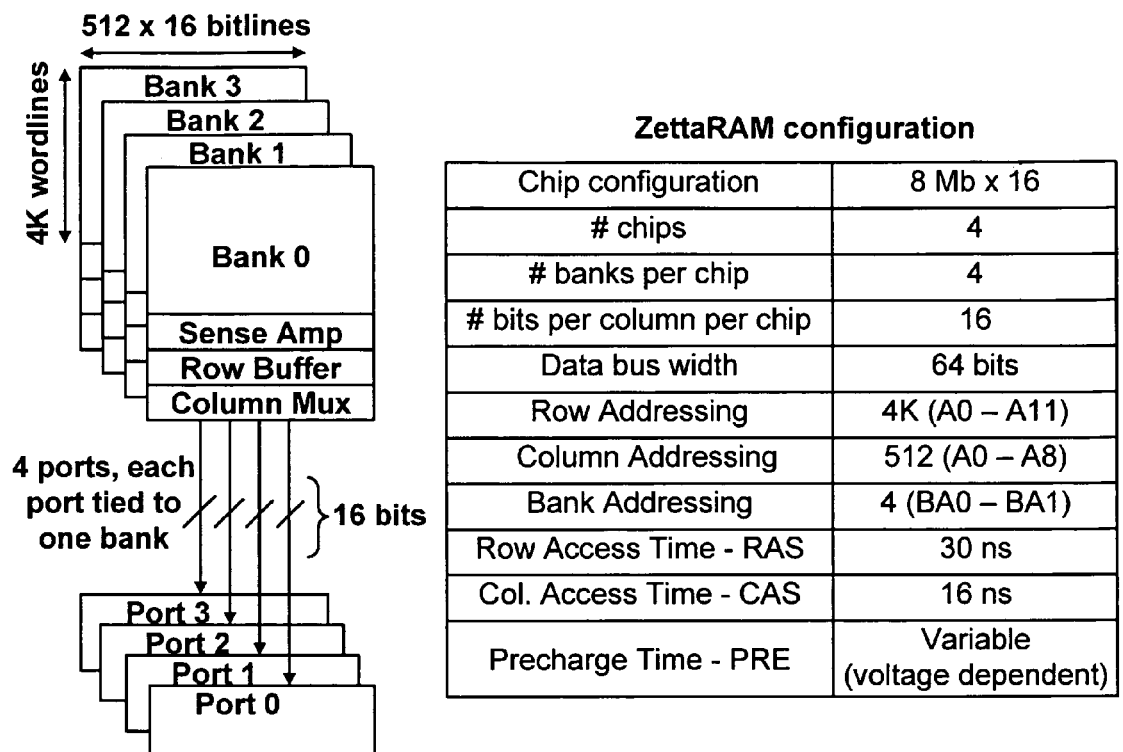
FIG. 16 is a block diagram illustrating an interleaved molecular memory system that may be used in memory systems, devices, and methods according to some embodiments of the present invention.

The interleaved ZettaRAM™ memory system, shown in FIG. 16, is modeled after synchronous DRAM (SDRAM), for example, Micron SDRAM 8M×16×4, Part No. MT48LC32M16A2TG-75, 2003.

The ZettaRAM™ memory system has 4 independent ports, with each port tied to a bank. The memory controller maps physical addresses to memory addresses (bank id, row id, and column id) and schedules pending memory requests. The memory controller maintains a separate queue of pending memory requests for each bank. There are two types of memory requests initiated by the L2 cache, fetch block and writeback block.

Memory access reordering is used by default. Fetch requests circumvent queued writeback requests unless there is an address match. Where indicated, configurations with memory access reordering disabled are also investigated.

A ZettaRAM™ page is a row in memory that is read into the row buffer to service memory requests. The memory controller can use one of two different policies to manage pages—open page policy and close page policy. In the close page policy, a page is "closed" after servicing the memory request, i.e., the page is immediately written back into its memory array. In the open page policy, a page is left "open" after reading the page into the row buffer, i.e., the data is held in the row buffer (cached). By keeping the page open, subsequent accesses to the same page need not suffer the penalty of opening the page. However, if there is a request to a different page in the same bank, the open page policy may suffer the penalty of closing the current page before opening the new page, thus sometimes increasing the wait time of fetch and writeback requests. Nonetheless, as the open page policy may significantly outperform the close page policy, the open page policy is used in the following simulations.

TABLE 1

Comparison of conventional DRAM and ZettaRAM attributes.

| Characteristic | DRAM | ZettaRAM |
|---|---|---|
| Write Voltage | 1.25 V (no lower) | 0.73 V–1.25 V |
| Area (0.18 µm technology) | 0.1296 µm² | 0.1296 µm² |
| Row access time (read an entire row) | 29 ns | 30 ns |
| Precharge time (write an entire row) | 9 ns | function of applied voltage [9 ns @ 1.2 V – 166 ns @ 1 V] |
| Column access time (select column) | 16 ns | 16 ns |
| Read precharge voltage | $V_{DD}/2$ (= 1.25/2 = 0.625 V) | OCP (= 0.3 V) |

TABLE 2

Bitline voltage transitions for DRAM and ZettaRAM.

| | Bitline Transition | | | |
|---|---|---|---|---|
| | read → write 0 | read → write 1 | write 0 → read | write 1 → read |
| % of all transitions, benchmark = mcf | 28.46% | 21.48% | 28.48% | 21.58% |
| Conventional DRAM ΔV | $-(V_{DD}/2)$ = $-0.625$ | $+(V_{d\_write\_1} - V_{DD}/2)$ = $0.625$ | $+(V_{DD}/2)$ = $0.625$ | $-(V_{d\_write\_1} - V_{DD}/2)$ = $-0.625$ |
| Fast ZettaRAM ΔV ($V_{z\_write\_1\_fast}$ = 1.2 V) | 0 | $+(V_{z\_write\_1\_fast} - V_{ocp})$ = $0.9$ | 0 | $-(V_{z\_write\_1\_fast} - V_{ocp})$ = $-0.9$ |
| Slow ZettaRAM ΔV ($V_{z\_write\_1\_slow}$ = 1.0 V) | 0 | $+(V_{z\_write\_1\_slow} - V_{ocp})$ = $0.7$ | 0 | $-(V_{z\_write\_1\_slow} - V_{ocp})$ = $-0.7$ |
| Baseline DRAM ΔV ($V_{read} = V_{d\_write\_0} = V_{ocp}$) | 0 | $+(V_{d\_write\_1} - V_{read})$ = $0.95$ | 0 | $-(V_{d\_write\_1} - V_{read})$ = $-0.95$ |

4.2 Memory Simulator: Modeling Energy

Bitline energy, i.e., the energy required to charge the bitline when opening or closing a page, can constitute up to 96% of the total memory system energy, as discussed in "VLSI Memory Chip Design" by K. Itoh, Springer Series in Advanced Microelectronics, 2001, pp. 117–123. Thus, in the experiments below, bitline energy consumption is measured in the main memory. The voltage states of all bitlines are tracked in order to measure the energy required to charge the bitlines for a particular memory operation.

Assuming a single voltage supply ($V_{DD}$), the energy to charge a bitline is $E_{bitline} = C_{BL} \cdot V_{DD} \cdot (\Delta V_{BL}) = C_{BL} \cdot V_{DD} \cdot (V_{z\_write\_1} - V_{ocp})$. Thus, dynamically adjusting the write-1 voltage yields linear energy scaling. If a dedicated voltage supply is used for charging the bitline ($V_{z\_write\_1}$), then $E_{bitline} = C_{BL} \cdot V_{z\_write\_1} \cdot (V_{z\_write\_1} - V_{ocp})$. Now, dynamically adjusting the write-1 voltage yields quadratic energy scaling. Dual voltage supplies may be used for the dual write voltages ($V_{z\_write\_1\_fast}$ and $V_{z\_write\_1\_slow}$). The supplies can be implemented using high-efficiency DC—DC converters, as discussed in "Minimizing Power Consumption in Digital CMOS Circuits" by A. P. Chandrakasan and R. W. Brodersen, Proc. of the IEEE, 83(4):498–523, April 1995. Dual voltages may be implemented in drowsy caches and selected in one to two cycles via a MUX, as described in "Drowsy Caches: Simple Techniques for Reducing Leakage Power" by K. Flautner, N. S. Kim, S. Martin, D. Blaauw, and T. Mudge, Int'l Symposium on Computer Architecture, July 2002.

The analytical model $C_{BL} \cdot V_{DD} \cdot (\Delta V_{BL})$ is derived by integrating power across the voltage supply ($V_{DD} \times I$), which yields the overall energy consumed, as opposed to integrating power across only the bitline capacitor ($V_{BL} \times I$). The analytical model was compared against SPICE simulations, resulting in a near-exact match.

4.3 Cycle-level Simulator

The memory simulator is integrated with a detailed cycle-level processor simulator.

The SimpleScalar ISA (PISA) and compiler (gcc-based) are used. Additional description of the SimpleScalar ISA can be found in "Evaluating Future Microprocessors: The Simplescalar Toolset" by D. Burger, T. Austin, and S. Bennett, Tech. Rep. CS-TR-96-1308, CS Department, Univ. of Wisc.-Madison, July 1996. The processor configuration is given in Table 3. The cache and bus configurations are based on the Pentium®4 processor, as further described in "The Microarchitecture of the Pentium®4 Processor" by G. Hinton, D. Sager, M. Upton, D. Boggs, D. Carmean, A. Kyker, and P. Roussel, Intel Technology Journal Q1, 2001.

The L1 instruction and data caches each allow up to 32 outstanding misses. The L2 cache allows up to 8 outstanding fetch requests at a time. Increasing the number of L2 MSHRs beyond 8 provided only minor performance benefits. The maximum number of outstanding L2 writeback requests may be limited by the buffering in the memory controller.

TABLE 3

Processor configuration.
4-issue OOO superscalar, 7-stage pipeline

| | |
|---|---|
| Frequency | 1 GHz |
| Reorder Buffer | 128 entries |
| Issue queue, LSQ | 64 entries |
| Branch predictor | gshare, $2^{16}$ entries |
| Functional units | 4, universal |

TABLE 3-continued

Processor configuration.
4-issue OOO superscalar, 7-stage pipeline

| | |
|---|---|
| Bus | 400 MHz 64-bit |
| L1 cache (split – I & D) | 8 KB, 4-way, 64 B line size |
| L2 cache (unified) | 256 KB, 8-way, 128 B line, writeback |
| Hit Latency | L1: 2 ns, L2: 10 ns |
| MSHRs | L1: 32, L2: 8 |

4.4 Benchmarks

Eight different integer benchmarks from the SPEC2000 benchmark suite are used with reference inputs. SimPoint is used to determine the appropriate starting simulation point for each benchmark, as further described in "Automatically Characterizing Large Scale Program Behavior" by T. Sherwood, E. Perelman, G. Hamerly and B. Calder, 10$^{th}$ Int'l Conf. on Architectural Support for Programming Languages and Operating Systems, October 2002. One hundred million instructions are then simulated from this simulation point. The SimPoints chosen for each benchmark are shown in Table 4. Table 4 also shows the rates of L1 and L2 cache misses (per 1000 instructions) and L2 writebacks (per 1000 instructions) to main memory for each benchmark.

TABLE 4

SPEC2000 benchmarks.

| | SimPoint (billions of instr.) | L1 misses* | L2 misses* | write-backs* | writebacks that close page* |
|---|---|---|---|---|---|
| bzip | 1 | 84.8 | 13.3 | 4.6 | 2.8 |
| gap | 209.5 | 87.8 | 4.2 | 1.8 | 1.2 |
| gcc | 11 | 98.8 | 9.6 | 3.13 | 2.4 |
| gzip | 48.7 | 97.0 | 4.7 | 1.91 | 1.5 |
| mcf | 31.7 | 208.6 | 80.3 | 31.84 | 23.8 |
| parser | 1.7 | 58.9 | 5.4 | 2.12 | 1.5 |
| twolf | 3.2 | 110.5 | 22.8 | 7.61 | 4.9 |
| vortex | 5.8 | 81.2 | 7.5 | 2.9 | 2.4 |

*per 1000 instructions

5. Results

5.1 DRAM Energy and Performance

Figure 17A:
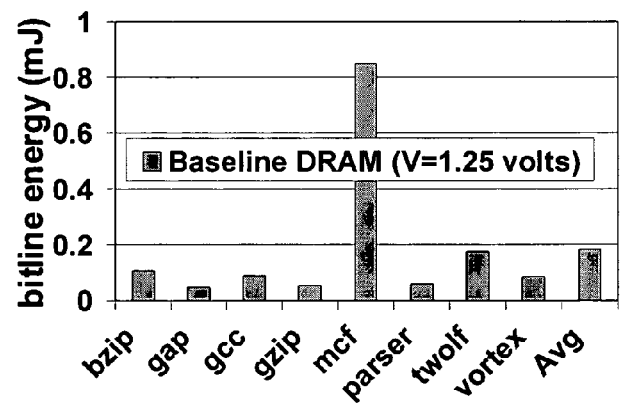
FIG. 17A is a graph illustrating bitline energy consumption for conventional DRAM.
Figure 17B:
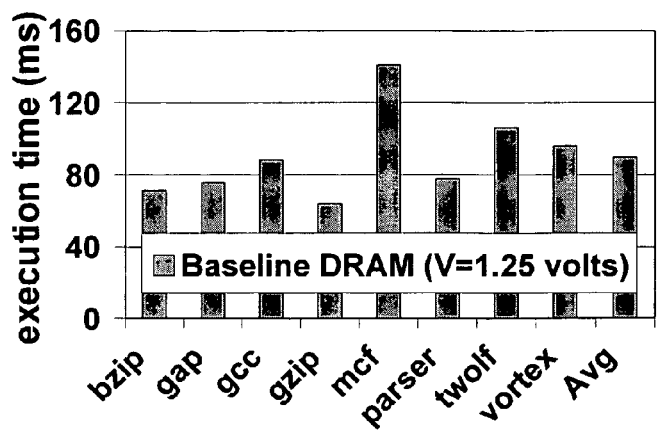
FIG. 17B is a graph illustrating total execution times for application programs in a system employing conventional DRAM.

FIG. 17A illustrates typical bitline energy consumption, and FIG. 17B illustrates typical execution times, for DRAM operating at 1.25 V. Within the DRAM memory controller, the pending request queue for each bank may be fixed at 4 entries. Memory access reordering may be used in the baseline unless otherwise indicated. Since 1.25 V may be at a lower boundary of reliable write voltages for DRAM, such a system is used as a baseline, and all ZettaRAM™ performance and energy measurements are normalized with respect to this baseline.

5.2 ZettaRAM™ Tradeoff Between Bitline Energy and System Performance

Next, the tradeoff between system performance and bitline energy as the ZettaRAM™ write voltage is manipulated is quantified. For each experiment, a single fixed write voltage is used to close pages, regardless of the type of request causing a page to close.

Figure 18A:
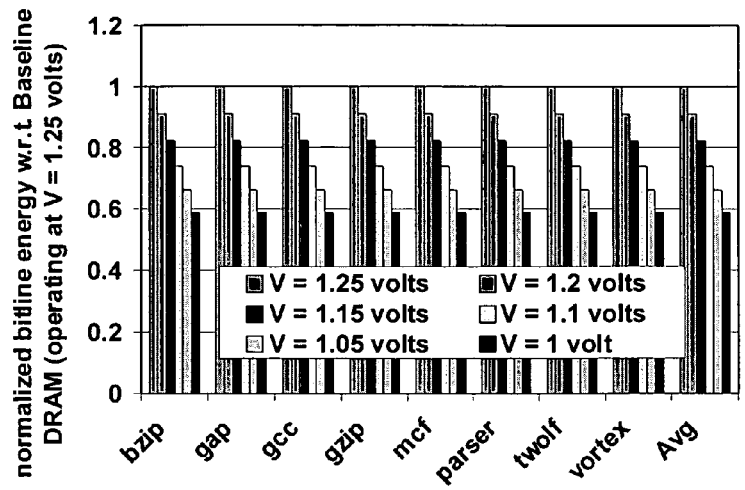
FIG. 18A is a graph illustrating normalized bitline energy consumption at various write voltages for a molecular memory device that may be used in memory systems, devices, and methods according to some embodiments of the present invention.
Figure 18B:
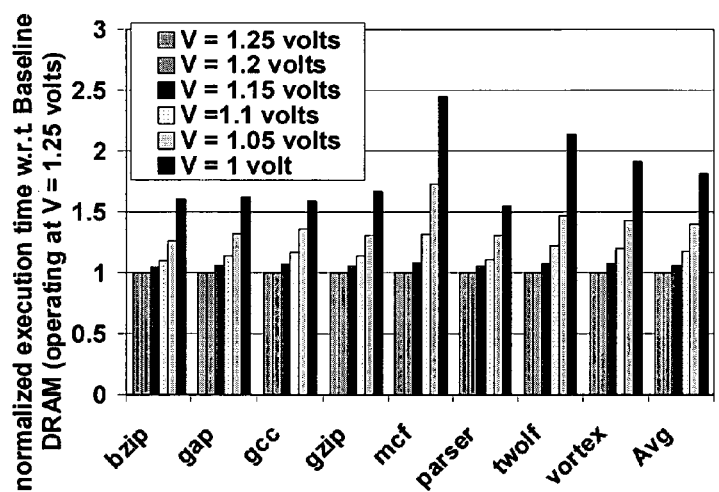
FIG. 18B is a graph illustrating normalized execution times for application programs at various write voltages in a molecular memory device that may be used in memory systems, devices, and methods according to some embodiments of the present invention.

FIG. 18A illustrates normalized bitline energy consumption, and FIG. 18B illustrates execution times, for Zetta RAM™ operating at fixed write voltages of 1.0 V through 1.25 V in 0.05 volt increments. At 1.25 V and 1.2 V, the execution times for ZettaRAM™ and the baseline DRAM appear to be equal because the intrinsic speed of the molecules is fast enough above 1.2 V, such that the write latency may be dictated by the peripheral circuitry. Thus, when a hybrid write policy discussed in detail below is employed according to some embodiments of the present invention, 1.2 V is used as the voltage for fast writes (high energy). However, at lower voltages, overall write latency and thereby system performance may be mainly determined by the intrinsic speed of the molecules.

As shown in FIG. 18A, lowering the write voltage from 1.25 V to 1.0 V reduces bitline energy by 41%. However, execution time increases by 50–150%, as shown in FIG. 18B. This is because write latency increases exponentially as the voltage differential between the write voltage and the threshold voltage decreases.

In the next subsections, memory system policies which may tap a significant amount of the energy savings potential without unduly sacrificing system-level performance are evaluated.

5.3 Hybrid Write Policy

Both fetch and writeback requests can cause the current page to close when there is a miss in the row buffer. Some embodiments of the present invention propose to handle these fetches and writebacks differently. Since fetch requests may be timing critical, the current page is closed using a fast write. On the other hand, as writeback requests may offer more scheduling flexibility because they may not directly stall the processor, the current page is closed using a slow write. A potential downside of this approach may be less energy savings than employing slow writes uniformly.

Figure 19A:
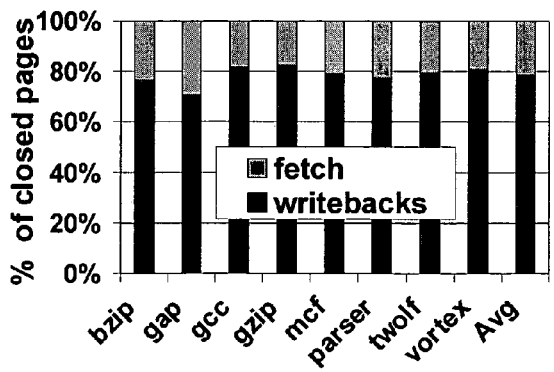
FIG. 19A is a graph illustrating percentages of closed pages due to writeback and fetch requests in a conventional memory device.
Figure 19B:
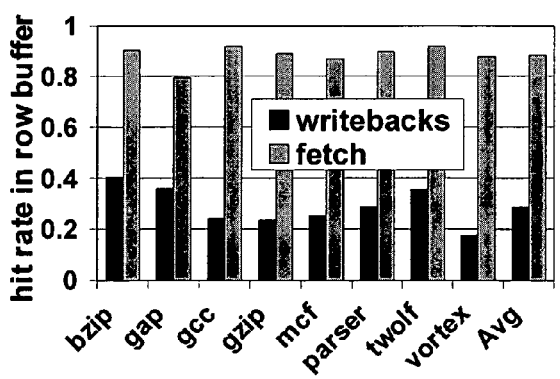
FIG. 19B is a graph illustrating row buffer hit rates for writeback and fetch requests in a conventional memory device.

Fortunately, most of the energy savings potential rests with writebacks that miss in the row buffer. The graph in FIG. 19A shows that 71–82% of all closed pages are closed on behalf of writebacks that miss in the row buffer. In contrast, only 18–29% of all closed pages are due to fetches that miss in the row buffer. Writebacks exhibit significantly lower locality than fetches, with respect to the row buffer. FIG. 19B shows that fetches hit 80–90% of the time, whereas writebacks hit only 18–40% of the time (29% on average). As such, employing slow writes when closing pages on behalf of writeback requests may achieve most of the energy savings potential. This result is confirmed by the following experiments.

Although delayed writebacks may not directly stall the processor, they may fill the memory controller's request queues, thereby stalling future fetch requests. Fortunately, writebacks may offer scheduling flexibility. The effects of queue size for tolerating delayed writebacks, in combination with the default policy of memory access reordering (fetch requests bypass queued writeback requests) are therefore investigated. Fast and slow writes are performed at 1.2 V and 1.0 V, respectively.

Figure 20A:
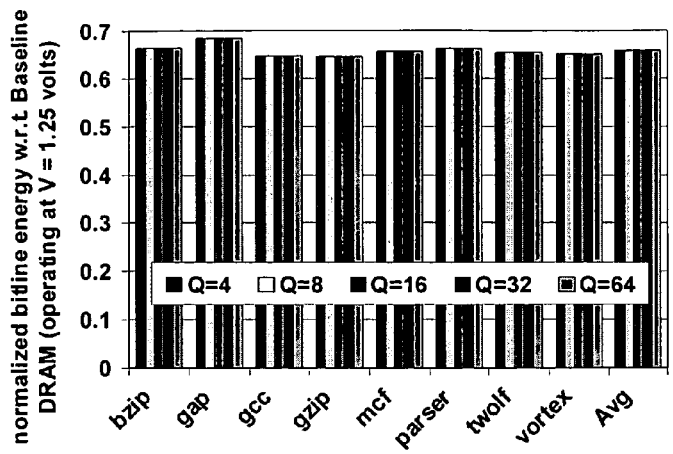
FIG. 20A is a graph illustrating normalized bitline energy consumption for a molecular memory device employing exemplary operations for performing write operations according to some embodiments of the present invention.
Figure 20B:
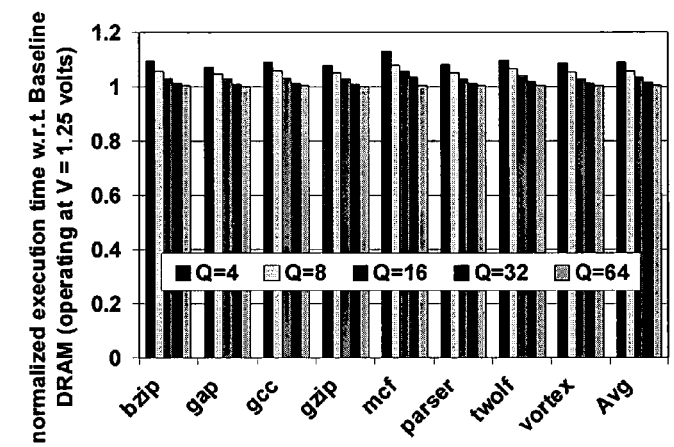
FIG. 20B is a graph illustrating normalized execution times for application programs in a system employing molecular memory devices and exemplary operations for performing write operations according to some embodiments of the present invention.

FIG. 20A illustrates bitline energy consumption, and FIG. 20B illustrates execution times, for ZettaRAM™ using a hybrid write policy according to some embodiments of the present invention and queue sizes of 4, 8, 16, 32 and 64 entries. A ZettaRAM™ memory system employing slow writes for pages closed by non-critical requests (writebacks) achieves 34% bitline energy savings with less than 1% performance degradation, if the pending request queue contains 64 entries and memory access reordering is used. As predicted, most of the energy savings potential is tapped by focusing only on non-critical writeback requests: 34% savings on average (FIG. 20A), compared to 41% savings when slow writes are applied uniformly (FIG. 18A, V=1.0). The residual performance degradation at smaller queue sizes (4–32) can be attributed to an increase in the number of queue-full stalls with respect to the baseline DRAM, caused by delayed writebacks. Nonetheless, the performance degradation with a queue size of 4 has been dramatically reduced, from an average slowdown of 80% with uniformly slow writes (FIG. 18B, V=1.0) to only 10% with hybrid fast/slow writes (FIG. 20B).

Enlarging the queues may increase system cost (as each entry may contain an entire cache block, thus 4 64-entry queues costs 31 KB more than 4 4-entry queues) and complexity. Fetch requests that circumvent queued writeback requests may first search the queue for possible address matches. With a larger queue, the complexity for checking these conflicts may increase. In Section 5.5, the impact of not reordering memory accesses to reduce complexity is measured. But first, eager writebacks are explored as an alternative to large queues in the next subsection.

5.4 De-clustering L2 Writeback Requests

Figure 21A:
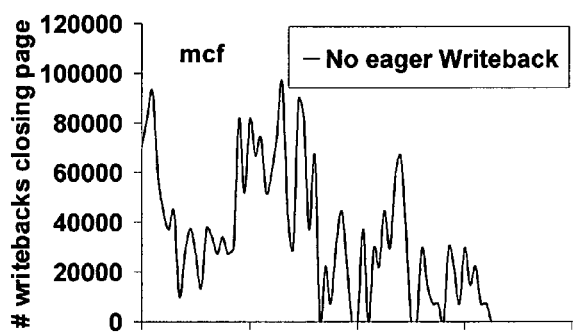
FIG. 21A is a graph illustrating arrival time for a next memory request in a molecular memory device employing exemplary operations for performing write operations according to some embodiments of the present invention.
Figure 21B:
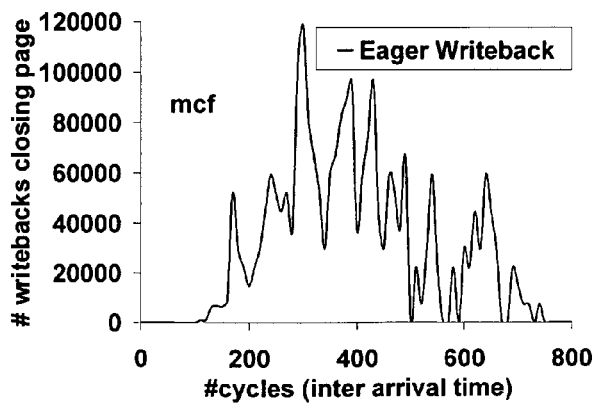
FIG. 21B is a graph illustrating arrival time for a next memory request in a molecular memory device employing eager writeback functionality in conjunction with exemplary operations for performing write operations according to some embodiments of the present invention.

To avoid the complexity of larger queues in the memory controller, techniques that evenly distribute writeback requests from the L2 cache can be employed. One such technique is eager writeback, in which a writeback is issued as soon as a dirty block becomes the LRU block in its set, instead of waiting for the block to be evicted. FIG. 21A illustrates the arrival time (in cycles) of the next request to a bank after a writeback request starts closing a page for the hybrid write policy with 4 queue entries, while FIG. 21B illustrates the arrival time for the hybrid write policy with 4 queue entries in conjunction with the eager writeback policy in the L2 cache. The measurements are for mcf (other benchmarks show similar patterns). As shown in FIG. 21B, the L2 eager writeback policy de-clusters the writeback requests to memory. For example, once a writeback request starts closing a page, the next request does not arrive for at least 100 cycles. In comparison, without eager writeback, about a quarter of all next requests arrive between 0 and 100 cycles, as shown in FIG. 21A.

Thus, with eager writebacks, a small queue may be used, in spite of delaying writebacks in the memory controller. Effectively, issuing the writeback early from the L2 cache may compensate for delaying it in the memory controller.

Figure 22A:
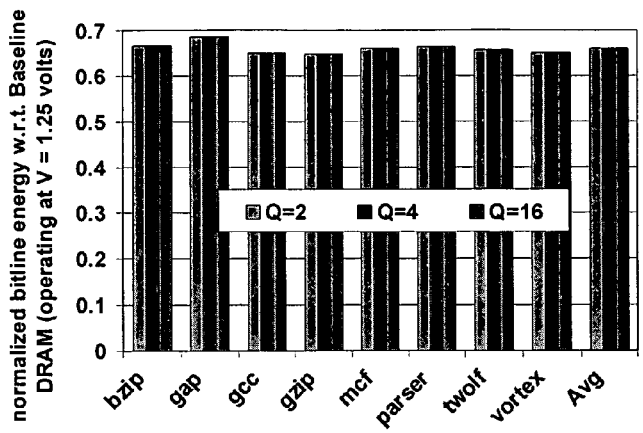
FIG. 22A is a graph illustrating normalized bitline energy consumption for a molecular memory device employing eager writeback functionality in conjunction with exemplary operations for performing write operations according to some embodiments of the present invention.
Figure 22B:
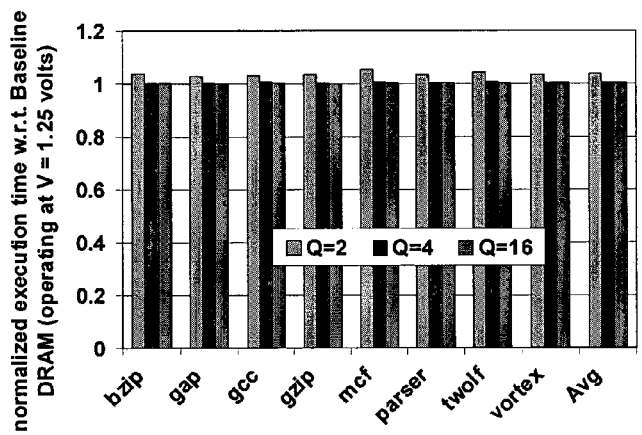
FIG. 22B is a graph illustrating normalized execution times for application programs in a system employing molecular memory devices and eager writeback functionality in conjunction with exemplary operations for performing write operations according to some embodiments of the present invention.

The results in shown in FIGS. 22A and 22B confirm this prediction. The L2 cache implements eager writeback for all configurations, including the baseline DRAM system to which energy and performance are normalized. As shown in FIG. 22B, L2 eager writebacks improve performance of the baseline DRAM system by only a negligible amount for these benchmarks, 0.6–1.3%, and bitline energy consumption is unaffected, as shown in FIG. 22A.

More particularly, FIG. 22B shows that L2 eager writebacks can be effective for eliminating performance degradation which otherwise may be caused by delayed writebacks in the memory controller. A ZettaRAM™ memory system employing slow writes for pages closed by non-critical requests according to some embodiments of the present invention can achieve 34% bitline energy savings with less than 1% performance degradation, with the L2 eager writeback policy. This can be achieved without the need to enlarge the request queue size with respect to the baseline system (4 entries). This can keep the cost and complexity of the memory controller similar to that of the baseline. Results are also presented for queue sizes of 2 and 16. The queue size of 2 entries degrades performance by 4%, whereas 16 entries performs only slightly better than 4 entries.

Figure 23:
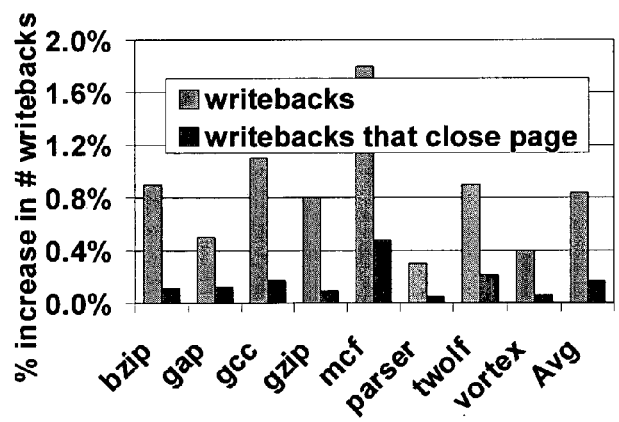
FIG. 23 is a graph illustrating a percentage increase in the number of L2 writeback requests in a molecular memory device employing eager writeback functionality in conjunction with exemplary operations for performing write operations according to some embodiments of the present invention.

The eager writeback policy may increase the number of L2 writeback requests, by occasionally writing back dirty blocks before the final store has occurred to the block before eviction. Fortunately, it is usually rare. FIG. 23 shows the percentage increase in the number of L2 writeback requests and L2 writeback requests that close a page in memory, because of premature writebacks. On average, there appears to be only a 0.84% increase in the number of writeback requests and a 0.16% increase in the number of writeback requests that close a page. Extra writebacks are accounted for in the primary results in FIGS. 22A and B.

5.5 Effect of Memory Access Reordering

Figure 24:
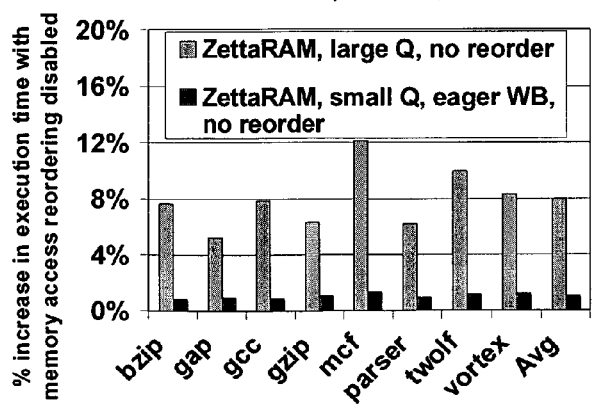
FIG. 24 is a graph illustrating a percentage increase in execution time in a molecular memory device employing exemplary operations for performing write operations according to some embodiments of the present invention when memory access reordering is disabled.

From the previous subsections, two competing alternatives have been presented for achieving high performance and low energy with a ZettaRAM™ memory system according to some embodiments of the present invention: (1) a hybrid write policy with a large queue vs. (2) a hybrid write policy with a small queue and L2 eager writebacks. In previous experiments, memory access reordering was used by default. Now, the impact of disabling memory access reordering for the two competing alternatives is measured. The increase in execution time when reordering is disabled is shown in FIG. 24 ("ZettaRAM™, large Q, no reorder" and "ZettaRAM™, small Q, eager WB, no reorder"). In some embodiments, memory access reordering can be performance-critical for the ZettaRAM™ that achieves latency tolerance via the large queue (execution time increases by 5–12% without reordering), but not performance-critical for the ZettaRAM™ that achieves latency tolerance via eager writebacks (execution time increases by less than 1.2% without reordering).

To sum up, the ZettaRAM™ with a hybrid write policy including fast/slow writes and L2 eager writebacks according to some embodiments of the present invention can tap most of the energy savings potential of ZettaRAM™ with little potential performance loss and potentially reduced complexity in the memory controller.

6. Conclusion

In some embodiments of the present invention, a hybrid write policy is provided in which slow writes (low energy) are applied to non-critical writebacks and fast writes (high energy) are applied to critical fetches. In some embodiments, the hybrid write policy may be combined with one of two techniques for tolerating delayed writeback requests: using a large pending request queue with memory access reordering or implementing the L2 eager writeback policy. Eager writeback can be synergistic with low-power Zetta RAM™ memory devices: initiating writebacks early in the L2 cache can compensate for delaying them at the memory controller. As shown in the results described above, applying slow writes non-uniformly coupled with small queues and the eager writeback policy can yield bitline energy savings of 34% (out of a possible 41% with uniformly slow writes), with less than 1% performance degradation.

Although a single choice of molecule was described herein, hundreds of such molecules have been characterized. Accordingly, embodiments of the present invention should not be so limited.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A memory system, comprising:

a plurality of storage cells, a respective one of which is configured to store a fixed charge therein when a write voltage applied thereto is above a predetermined threshold voltage and to discharge the fixed charge therefrom when the write voltage applied thereto is below the threshold voltage, at a latency that is a function of a voltage differential between the write voltage and the threshold voltage; and a variable-latency write circuit for the plurality of storage cells that is configured to dynamically vary the voltage differential between the write voltage and the threshold voltage to provide a variable-latency write operation that stores the fixed charge therein or discharges the fixed charge therefrom.

2. A memory system according to claim 1, wherein the variable-latency write circuit is configured to dynamically vary the write voltage applied to the storage cell responsive to a control signal from a processing device.

3. A memory system according to claim 2, wherein the variable-latency write circuit is configured to provide the write voltage at a first voltage differential from the threshold voltage responsive to a first control signal from the processing device and provide the write voltage at a second voltage differential from the threshold voltage that is greater than the first voltage differential responsive to a second control signal from the processing device.

4. A memory system according to claim 3, wherein the first control signal indicates that the write operation does not delay operations of the processing device and wherein the second control signal indicates that the write operation delays operations of the processing device.

5. A memory system according to claim 3, wherein the variable-latency write circuit is configured to provide the write voltage at the first voltage differential to increase latency of the write operation and reduce power consumption of the storage cell and/or the memory system relative to that at the second voltage differential.

6. A memory system according to claim 3, wherein the variable-latency write circuit is configured to provide the write voltage at the second voltage differential to reduce latency of the write operation relative to that at the first voltage differential.

7. A memory system according to claim 3 in combination with the processing device.

8. A memory system according to claim 3, wherein the plurality of storage cells define a DRAM device, wherein the processing device comprises a central processing unit and a cache memory device, wherein the first control signal comprises a writeback request, wherein the second control signal comprises a fetch request, and wherein the write voltage comprises an applied bitline voltage.

9. A memory system according to claim 8, wherein the writeback request is received at the variable-latency write circuit when a corresponding block of the cache memory device has been modified and is a least-recently-used (LRU) block.

10. A memory system according to claim 8, wherein the processing unit further comprises a memory controller including a memory request queue therein, wherein the variable-latency write circuit is configured to provide the write voltage at the second voltage differential when the memory request queue includes a fetch request and/or more than one writeback request.

11. A memory system according to claim 8, wherein DRAM device includes a row buffer therein, and wherein the variable-latency write circuit is further configured to provide the write voltage at the first voltage differential and/or at the second voltage differential responsive to a row buffer miss.

12. A memory system according to claim 1, wherein the respective one of the plurality of storage cells comprises a charge storage molecule configured to store a fixed charge therein when the write voltage is above the threshold voltage and to discharge the fixed charge therefrom when the write voltage is below the threshold voltage, and wherein the threshold voltage comprises an oxidation potential for the charge storage molecule.

13. The memory system according to claim 11, wherein the charge storage molecule comprises a porphyrin molecule and/or a ferrocene molecule.

14. A device for writing to a plurality of storage cells, a respective one of which is configured to store a fixed charge therein when a write voltage applied thereto is above a threshold voltage and to discharge the fixed charge therefrom when the write voltage applied thereto is below the threshold voltage, the device comprising:
a variable-latency write circuit for the plurality of storage cells that is configured to dynamically vary a voltage differential between the write voltage and the threshold voltage to provide a variable-latency write operation that stores the fixed charge in the respective one of the storage cells or discharges the fixed charge therefrom.

15. A device according to claim 14, wherein the variable-latency write circuit is configured to dynamically vary the write voltage applied to the storage cell responsive to a control signal.

16. A device according to claim 15, wherein the variable-latency write circuit is configured to provide the write voltage at a first voltage differential from the threshold voltage responsive to a first control signal and provide the write voltage at a second voltage differential from the threshold voltage that is greater than the first voltage differential responsive to a second control signal.

17. A device according to claim 16, wherein the first control signal indicates that the write operation does not delay operations of a processing device and wherein the second control signal indicates that the write operation delays operations of the processing device.

18. A device according to claim 16, wherein the variable-latency write circuit is configured to provide the write voltage at the first voltage differential to increase latency of the write operation and reduce power consumption of the storage cell relative to that at the second voltage differential.

19. A device according to claim 16, wherein the variable-latency write circuit is configured to provide the write voltage at the second voltage differential to reduce latency of the write operation relative to that at the first voltage differential.

20. A method of performing write operations in a memory device comprising a plurality of storage cells, a respective one of which is configured to store a fixed charge therein when a write voltage applied thereto is above a threshold voltage and to discharge the fixed charge therefrom when the write voltage applied thereto is below the threshold voltage, the method comprising:
dynamically varying a voltage differential between the write voltage and the threshold voltage to perform a variable-latency write operation that stores the fixed charge in the respective one of the storage cells or discharges the fixed charge therefrom.

21. A method according to claim 20, wherein dynamically varying the voltage differential comprises:
dynamically varying the write voltage applied to the storage cell responsive to receiving a control signal.

22. A method according to claim 21, wherein dynamically varying the voltage differential further comprises:
providing the write voltage at a first voltage differential from the threshold voltage responsive to a first control signal; and
providing the write voltage at a second voltage differential from the threshold voltage that is greater than the first voltage differential responsive to a second control signal.

23. A method according to claim 22, wherein providing the write voltage at the first voltage differential comprises providing the write voltage at the first voltage differential when the write operation does not delay operations of a processing device, and wherein providing the write voltage at the second voltage differential comprises providing the write voltage at the second voltage differential when the write operation delays operations of the processing device.

24. A method according to claim 22, wherein providing the write voltage at a first voltage differential comprises:
providing the write voltage at the first voltage differential to perform an increased-latency write operation and reduce power consumption of the storage cell relative to that at the second voltage differential.

25. A method according to claim 22, wherein providing the write voltage at a second voltage differential comprises:
providing the write voltage at the second voltage differential to perform a reduced-latency write operation relative to that at the first voltage differential.

26. A method according to claim 22, wherein the first control signal comprises a writeback request, and wherein the second control signal comprises a fetch request, and wherein providing the write voltage at the first voltage differential and/or at the second voltage differential is responsive to a cache miss.

27. A method according to claim 26, wherein providing the write voltage at the first voltage differential and/or at the second voltage differential is responsive to a row buffer miss in a row buffer of the memory device.

28. A method according to claim 26, further comprising:
receiving the writeback request when a corresponding block of cache memory has been modified and is a least-recently-used (LRU) block.

29. A method according to claim 22, wherein providing the write voltage at the second voltage differential comprises:
providing the write voltage at the second voltage differential when a memory request queue in a memory controller includes a fetch request and/or more than one writeback request.

30. A method according to claim 20, wherein the respective one of the storage cells comprises a charge storage molecule, and wherein dynamically varying a the voltage differential comprises:
dynamically varying a voltage differential between the write voltage and an oxidation potential of the charge storage molecule to perform a variable-latency write operation that stores the fixed charge in the charge storage molecule or discharges the fixed charge therefrom.

31. A method according to claim 30, wherein the charge storage molecule comprises a porphyrin molecule and/or a ferrocene molecule.

* * * * *